US011959502B2

(12) United States Patent
McLean, Jr. et al.

(10) Patent No.: US 11,959,502 B2
(45) Date of Patent: Apr. 16, 2024

(54) CONTROL OF A PRESSURE EXCHANGER SYSTEM

(71) Applicant: Energy Recovery, Inc., San Leandro, CA (US)

(72) Inventors: James Elliott McLean, Jr., Houston, TX (US); Patrick Morphew, Houston, TX (US); Joseph Michael Marchetti, Spring, TX (US); Chengyu Zhang, San Ramon, CA (US); Kyaw Thu, Lathrop, CA (US)

(73) Assignee: Energy Recovery, Inc, San Leandro, CA (US)

( * ) Notice: Subject to any disclaimer, the term of this patent is extended or adjusted under 35 U.S.C. 154(b) by 0 days.

(21) Appl. No.: 17/858,610

(22) Filed: Jul. 6, 2022

(65) Prior Publication Data

US 2023/0008069 A1 Jan. 12, 2023

Related U.S. Application Data

(60) Provisional application No. 63/220,423, filed on Jul. 9, 2021.

(51) Int. Cl.
*F15B 3/00* (2006.01)
*E21B 43/26* (2006.01)
*F04F 13/00* (2009.01)

(52) U.S. Cl.
CPC ................ *F15B 3/00* (2013.01); *F04F 13/00* (2013.01); *E21B 43/2607* (2020.05)

(58) Field of Classification Search
CPC .......... E21B 43/2607; F04F 13/00; F15B 3/00
See application file for complete search history.

(56) References Cited

U.S. PATENT DOCUMENTS

2011/0008182 A1 1/2011 Krogsgard et al.
2017/0321521 A1* 11/2017 Lewis ................. E21B 43/2607
2020/0149557 A1* 5/2020 Le Doux, Jr. ....... E21B 43/2607
2020/0400000 A1 12/2020 Ghasripoor et al.
2021/0180617 A1* 6/2021 Boyko ................ E21B 43/2607

FOREIGN PATENT DOCUMENTS

WO 2014018585 A1 1/2014
WO 2016176531 A1 11/2016

OTHER PUBLICATIONS

International Search Report and Written Opinion of International patent application No. PCT/US2022/36570 dated Oct. 4, 2022, 13 pages.

* cited by examiner

*Primary Examiner* — Kenneth Bomberg
*Assistant Examiner* — Matthew Wiblin
(74) *Attorney, Agent, or Firm* — Lowenstein Sandler LLP

(57) ABSTRACT

A system includes a pressure exchanger (PX) configured to receive a first fluid via a first inlet and a second fluid via a second inlet. The PX is to exchange pressure between the first fluid and the second fluid and provide the first fluid at a first outlet and the second fluid at a second outlet. The system further includes a first sensor to provide first sensor data associated with the first fluid prior to the first fluid entering the first inlet and a second sensor to provide second sensor data associated with the second fluid prior to the second fluid entering the second inlet. The system further includes a controller to receive user input and cause a first adjustment of the flowrate of the first fluid into the first inlet and cause a second adjustment of the flowrate of the second fluid into the second inlet.

20 Claims, 10 Drawing Sheets

CONTROL OF A PRESSURE EXCHANGER SYSTEM

RELATED APPLICATION

This application claims the benefit of Provisional Application No. 63/220,423, filed Jul. 9, 2021, the content of which is hereby incorporated by reference in its entirety.

TECHNICAL FIELD

The present disclosure relates to control of systems, and, more particularly, control of pressure exchanger systems.

BACKGROUND

Systems use fluids at different pressures. Pumps may be used to increase pressure of fluids used by systems.

BRIEF DESCRIPTION OF THE DRAWINGS

The present disclosure is illustrated by way of example, and not by way of limitation in the figures of the accompanying drawings.

DETAILED DESCRIPTION OF EMBODIMENTS

Figure 1A:
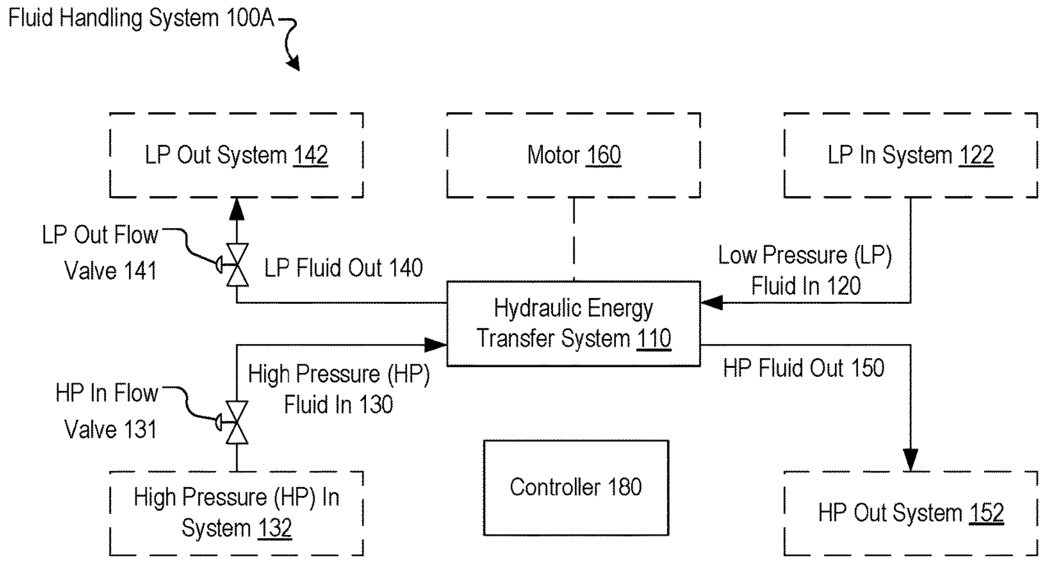
FIGS. 1A-D illustrate schematic diagrams of fluid handling systems including hydraulic energy transfer systems, according to certain embodiments.

Embodiments described herein are related to control of pressure exchanger systems (e.g., fluid handling systems, systems that include a pressure exchanger as a low pressure slurry pump).

Systems may use fluids at different pressures. These systems may include hydraulic fracturing (e.g., fracking or fracing) systems, desalinization systems, refrigeration systems, mud pumping systems, slurry pumping systems, industrial fluid systems, waste fluid systems, fluid transportation systems, etc. Pumps may be used to increase pressure of fluid to be used by systems.

Conventionally, systems use pumps to raise the head (pressure) of a fluid containing solid particles (e.g., particle-laden fluid, a slurry fluid), chemicals, and/or that has a viscosity that meets a threshold value. Conventionally, the solid particles (e.g., sand, powder, debris, ceramics, etc.), chemicals, and/or viscosity damage and reduce efficiency of pumps over time. Conventional systems then undergo more downtime so that pumps can undergo maintenance, repair, and replacement.

Some conventional systems use specialized pumps that have large clearances, may use costly exotic or hardened materials, and/or may be rubber-lined to reduce damage caused by the solid particles (e.g., abrasives), chemicals, and/or viscosity associated with the fluid. These pumps may be inefficient, requiring multiple pumps to be used in series to attempt to provide the desired head (pressure). These pumps still undergo abrasion and erosion. These pumps used in conventional systems may have an increased cost for materials, added manufacturing complexities, and decrease in overall system efficiencies. Erosion and/or abrasion in a pump reduces life, reduces efficiency, increases leakage, increases service intervals, increases replacement of parts, and reduces yield (e.g., of desalinization, fracing, refrigeration, slurry pumping), etc.

The systems, devices, and methods of the present disclosure provide control of pressure exchanger systems. In some embodiments, a pressure exchanger system includes a pressure exchanger (PX). The PX may be configured to receive a first fluid (e.g., a fluid substantially free of particles, a fluid that meets a first threshold viscosity, a fluid substantially free of particular chemicals, a non-caustic fluid, a non-acidic fluid, etc.) via a first inlet (e.g., a high pressure inlet). The PX may be configured to receive a second fluid (e.g., a particle-laden fluid, a fluid that meets a second threshold viscosity that is higher than the first threshold viscosity, a fluid that contains the particular chemicals, a caustic fluid, an acidic fluid, etc.) via a second inlet (e.g., a low pressure inlet). When entering the PX, the first fluid may have a higher pressure than the second fluid. The PX may be configured to exchange pressure between the first fluid and the second fluid. The first fluid may exit the PX via a first outlet (e.g., a low pressure outlet) and the second fluid may exit the PX via a second outlet (e.g., a high pressure outlet). When exiting the PX, the second fluid may have a higher pressure than the first fluid (e.g., pressure has been exchanged between the first fluid and the second fluid).

The pressure exchanger system may further include a first sensor configured to provide first sensor data associated with the first fluid prior to the first fluid entering the first inlet of the PX. In some embodiments, the first sensor is a pressure sensor configured to provide pressure data of the first fluid prior to the first fluid entering the PX. In some embodiments, the first sensor is a flowrate sensor configured to provide flowrate data (e.g., volumetric flow rate, mass flow rate, etc.) of the first fluid prior to the first fluid entering the PX. In some embodiments, the first sensor may be a velocity sensor or a pressure sensor.

The pressure exchanger system may further include a second sensor configured to provide second sensor data associated with the second fluid prior to the second fluid entering the second inlet of the PX. In some embodiments, the second sensor is a pressure sensor configured to provide pressure data of the second fluid prior to the second fluid entering the PX. In some embodiments, the second sensor is a flowrate sensor configured to provide flowrate data of the second fluid prior to the second fluid entering the PX.

In some embodiments, the pressure exchanger systems further includes a controller (e.g., processing device, etc.). The controller may be configured to receive user input associated with a target flowrate of the first fluid into the PX. The user input may be a desired flowrate set by a user (e.g., a technician, an operator, an engineer, etc.) based on local requirements (e.g., plant requirements, mine requirements, pumping requirements, etc.). The controller may cause a first adjustment of a first flowrate of the first fluid into the first inlet of the PX based on the user input and the first sensor data. For example, the controller may cause an adjustment of the first flowrate so that the first flowrate matches the user input (e.g., the target flowrate). The controller may also cause a second adjustment of a second flowrate of the second fluid into the second inlet of the PX based on the first sensor data and the second sensor data. In some embodiments, the controller causes the first and/or second adjustment by actuating one or more valves (e.g., HP in flow valve and LP out flow valve). In some embodiments, the controller causes the first and/or second adjustment by controlling one or more supply pumps (e.g., one or more high pressure fluid pumps and/or one or more low pressure fluid pumps).

The systems, devices, and methods of the present disclosure has advantages over conventional solutions. The present disclosure may use a reduced amount of pumping capacity (e.g., uses less pumps, uses less energy to power the pumps) compared to conventional systems. This causes the present disclosure to have increased efficiency and to undergo less maintenance compared to conventional solutions. By using a reduced pump capacity (e.g., reduced amount of pumps), the present disclosure uses less energy to raise the head (pressure) of the fluid compared to conventional systems. Additionally, the present disclosure reduces wear on components (e.g., pumps, valves, sensors) compared to conventional systems. The present disclosure uses pumps (e.g., high-pressure pumps) that raise the head (e.g., pressure) of a substantially particle-free fluid, a fluid that has a lower viscosity, a fluid that does not include particular chemicals, etc. to raise the head (e.g., pressure) of a particle-laden fluid, higher velocity fluid, a fluid that includes particular chemicals, etc. compared to the conventional solution of using high-pressure pumps to directly raise the head of the particle-laden fluid, higher velocity fluid, fluid that includes particular chemicals, etc. The present disclosure uses valves and/or pumps to control the flowrate of the substantially particle-free fluid to control flowrate of the particle-laden fluid compared to conventional systems that only control flowrate of the particle-laden fluid directly. The present disclosure uses sensors to provide sensor data associated with the substantially particle-free fluid compared to conventional solutions that only have sensors directly providing sensor data of the particle-laden fluid. This allows the present disclosure to have increased reliability, less component maintenance, increased service life of components, decreased downtime of the system, and increased yield (e.g., of desalination, fracing, refrigeration, slurry pumping, etc.). The present disclosure may use a pressure exchanger that allows for longer life of components of the system, that increases system efficiency, allows end users to select from a larger range of pumps, reduces maintenance and downtime to service pumps, and allows for new instrumentation and control devices.

Although some embodiments of the present disclosure are described in relation to pressure exchangers, energy recovery devices, and hydraulic energy transfer systems, the current disclosure can be applied to other systems and devices (e.g., pressure exchanger that is not isobaric, rotating components that are not a pressure exchanger, a pressure exchanger that is not rotary, etc.).

Although some embodiments of the present disclosure are described in relation to exchanging pressure between fluid used in fracing systems, desalinization systems, slurry pumping systems, and/or refrigeration systems, the present disclosure can be applied to other types of systems. Fluids can refer to liquid, gas, transcritical fluid, supercritical fluid, subcritical fluid, and/or combinations thereof.

Although some embodiments of the present disclosure are described in relation to particle-laden fluid and substantially particle-free fluid, the present disclosure can be applied to other types of fluids, such as higher velocity fluid and lower velocity fluid, fluid that has more than a threshold amount of certain chemicals and fluid that has less than the threshold amount of certain chemicals, etc.

FIG. 1A illustrates a schematic diagram of a fluid handling system 100A that includes a hydraulic energy transfer system 110, according to certain embodiments.

In some embodiments, a hydraulic energy transfer system 110 includes a pressure exchanger (e.g., PX). The hydraulic energy transfer system 110 (e.g., PX) receives low pressure (LP) fluid in 120 (e.g., via a low-pressure inlet) from an LP in system 122. The hydraulic energy transfer system 110 also receives high pressure (HP) fluid in 130 (e.g., via a high-pressure inlet) from HP in system 132. The flow of the HP fluid in 130 may be controlled by HP in flow valve 131. The hydraulic energy transfer system 110 (e.g., PX) exchanges pressure between the HP fluid in 130 and the LP fluid in 120 to provide LP fluid out 140 (e.g., via low-pressure outlet) to LP fluid out system 142 and to provide HP fluid out 150 (e.g., via high-pressure outlet) to HP fluid out system 152. The flow of LP fluid out 140 may be controlled by LP out flow valve 141. A controller 180 may cause an adjustment of flowrates of HP fluid in 130 and LP fluid out 140 by HP in flow valve 131 and LP out flow valve 141 respectively. The controller 180 may cause HP in flow valve 131 and LP out flow valve 141 to actuate.

In some embodiments, the hydraulic energy transfer system 110 includes a PX to exchange pressure between the HP fluid in 130 and the LP fluid in 120. In some embodiments, the PX is substantially or partially isobaric (e.g., an isobaric pressure exchanger (IPX)). The PX may be a device that transfers fluid pressure between HP fluid in 130 and LP fluid in 120 at efficiencies (e.g., pressure transfer efficiencies, substantially isobaric) in excess of approximately 50%, 60%, 70%, 80%, 90%, or greater (e.g., without utilizing centrifugal technology). High pressure (e.g., HP fluid in 130, HP fluid out 150) refers to pressures greater than the low pressure (e.g., LP fluid in 120, LP fluid out 140). LP fluid in 120 of the PX may be pressurized and exit the PX at high pressure (e.g., HP fluid out 150, at a pressure greater than that of LP fluid in 120), and HP fluid in 130 may be depressurized and exit the PX at low pressure (e.g., LP fluid out 140, at a pressure less than that of the HP fluid in 130). The PX may operate with the HP fluid in 130 directly applying a force to pressurize the LP fluid in 120, with or without a fluid separator between the fluids. Examples of fluid separators that may be used with the PX include, but are not limited to, pistons, bladders, diaphragms and the like. In some embodiments, PXs may be rotary devices. Rotary PXs, such as those manufactured by Energy Recovery, Inc. of San Leandro, Calif., may not have any separate valves, since the effective valving action is accomplished internal to the device via the relative motion of a rotor with respect to end covers. Rotary PXs may be designed to operate with internal pistons to isolate fluids and transfer pressure with relatively little mixing of the inlet fluid streams. Reciprocating PXs may include a piston moving back and forth in a cylinder for transferring pressure between the fluid streams. Any PX or multiple PXs may be used in the present disclosure, such as, but not limited to, rotary PXs, reciprocating PXs, or any combination thereof. In addition, the PX may be disposed on a skid separate from the other components of a fluid handling system 100 (e.g., in situations in which the PX is added to an existing fluid handling system). For example, the PX may be fastened to a structure that can be moved from one site to another. The PX may be coupled to a system (e.g., pipes of a system, etc.) that has been built on-site. The structure to which the PX is fastened may be referred to as a 'skid.'

In some embodiments, a motor 160 is coupled to hydraulic energy transfer system 110 (e.g., to a PX). In some embodiments, the motor 160 controls the speed of a rotor of the hydraulic energy transfer system 110 (e.g., to increase pressure of HP fluid out 150, to decrease pressure of HP fluid out 150, etc.). In some embodiments, motor 160 generates energy (e.g., acts as a generator) based on pressure exchanging in hydraulic energy transfer system 110.

The hydraulic energy transfer system 110 may be a hydraulic protection system (e.g., hydraulic buffer system, hydraulic isolation system) that may block or limit contact between solid particle laden fluid (e.g., frac fluid, slurry fluid) or corrosive fluid (e.g., caustic fluid, acidic fluid) and one or more equipment (e.g., hydraulic fracturing equipment, high-pressure pumps) while exchanging work and/or pressure with another fluid. By blocking or limiting contact between one or more equipment (e.g., hydraulic fracturing equipment, high pressure pumps, etc.) and solid particle containing fluid or the corrosive fluid, the hydraulic energy transfer system 110 increases the life and performance, while reducing abrasion and wear, of one or more equipment (e.g., hydraulic fracturing equipment, high pressure fluid pumps, etc.). Equipment that is less costly, has less stringent tolerances, is made of different materials may be used in the fluid handling system 100 by using equipment (e.g., high pressure fluid pumps) not designed for abrasive fluids (e.g., frac fluids, slurry fluids, particle-laden fluids, and/or corrosive fluids, etc.).

The hydraulic energy transfer system 110 may include a hydraulic turbocharger or hydraulic pressure exchanger, such as a rotating PX. The PX may include one or more chambers (e.g., 1 to 100) to facilitate pressure transfer between first and second fluids (e.g., gas, liquid, multi-phase fluid). In some embodiments, the PX may transfer pressure between a first fluid (e.g., pressure exchange fluid, such as a proppant free fluid, substantially proppant free fluid, lower viscosity fluid, fluid that has lower than a threshold amount of certain chemicals, non-caustic fluid, non-acidic fluid, etc.) and a second fluid that may have a higher viscosity (e.g., be highly viscous), include more than a threshold amount of certain chemicals (e.g., a caustic fluid, an acidic fluid, etc.), and/or contain solid particles (e.g., frac fluid containing sand, proppant, powders, debris, ceramics, etc.). The second fluid may contain detritus (e.g., waste and/or debris) that is to be carried away from a process. For example, the second fluid may include ground chicken bones suspended in water to be carried away from a chicken processing operation.

Fluid handling system 100A may additionally include one or more sensors to provide sensor data (e.g., flowrate data, pressure data, velocity data, etc.) associated with the fluids of fluid handling system 100A. HP in flow valve 131 may control a flowrate of HP fluid in 130 based on sensor data received from a sensor associated with HP fluid in 130 (e.g., a sensor disposed in the piping of HP fluid in 130). HP in flow valve 131 may control the flow rate of HP fluid in 130 based on a target flowrate. The target flowrate may be determined by controller 180 based on user input by a user (e.g., a technician, operator, engineer, etc.). LP out flow valve 141 may control a flowrate of LP fluid out 140 based on sensor data received from the one or more sensors. In some embodiments, controller 180 causes HP in flow valve 131 and/or LP out flow valve 141 to actuate based on sensor data received.

The hydraulic energy transfer system 110 may be used in different types of systems, such as fracing systems (e.g., FIG. 1B), desalination systems (e.g., FIG. 1C), refrigeration systems (e.g., FIG. 1D), slurry pumping systems, industrial fluid systems, waste fluid systems, fluid transportation systems, etc.

Figure 1B:
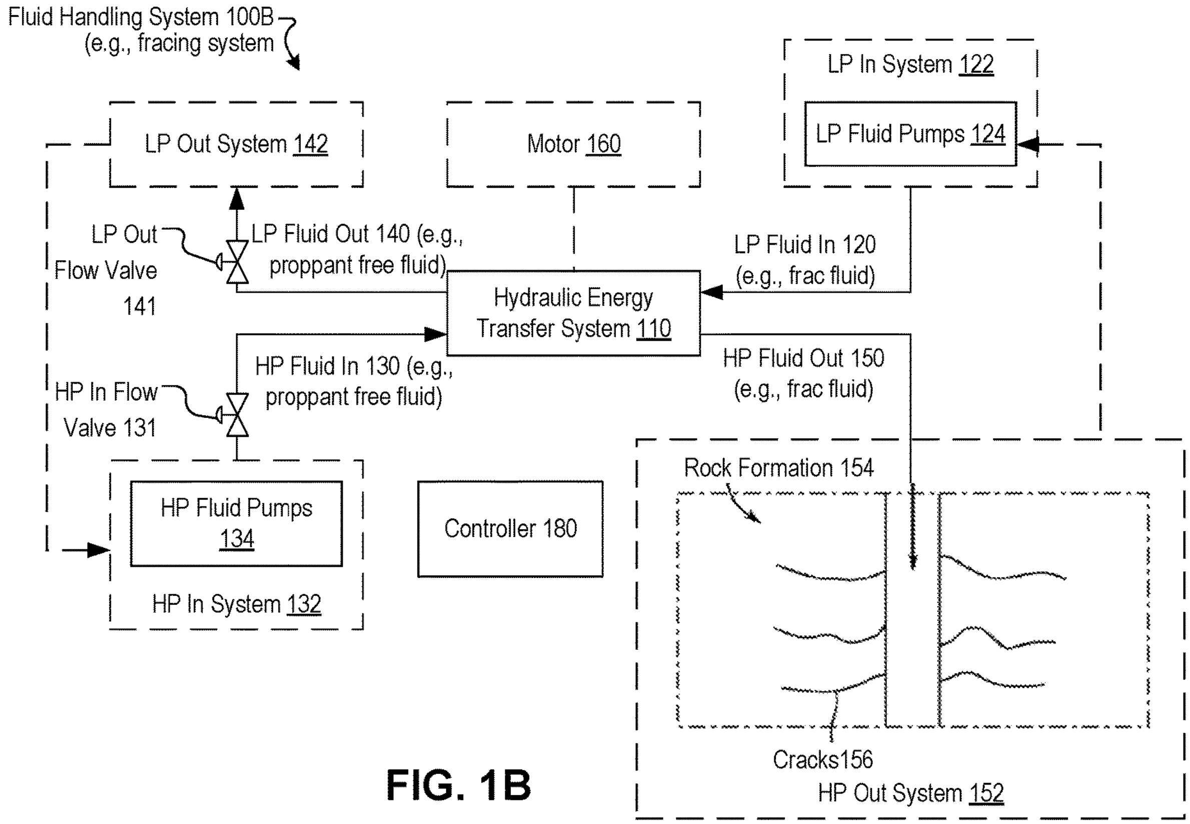

FIG. 1B illustrates a schematic diagram of a fluid handling system 100B including a hydraulic energy transfer system 110, according to certain embodiments. Fluid handling system 100B may be a fracing system. In some embodiments, fluid handling system 100B includes more components, less components, same routing, different routing, and/or the like than that shown in FIG. 1B. Some of the features in FIG. 1B that have similar reference numbers as those in FIG. 1A may have similar properties, functions, and/or structures as those in FIG. 1A.

LP fluid in 120 and HP fluid out 150 may be frac fluid (e.g., fluid including solid particles, proppant fluid, etc.). HP fluid in 130 and LP fluid out 140 may be substantially solid particle free fluid (e.g., proppant free fluid, water, filtered fluid, etc.).

LP in system 122 may include one or more low pressure fluid pumps to provide LP fluid in 120 to the hydraulic energy transfer system 110 (e.g., PX). HP in system 132 may include one or more high pressure fluid pumps 134 to provide HP fluid in 130 to hydraulic energy transfer system 110 via HP in flow valve 131. The controller 180 may control the high pressure fluid pumps 134, low pressure fluid pumps 124, HP in flow valve 131, and/or LP out flow valve 141.

Hydraulic energy transfer system 110 exchanges pressure between LP fluid in 120 (e.g., low pressure frac fluid) and HP fluid in 130 (e.g., high pressure water) to provide HP fluid out 150 (e.g., high pressure frac fluid) to HP out system 152 and to provide LP fluid out 140 (e.g., low pressure water) to LP out system 142 via LP out flow valve 141. HP out system 152 may include a rock formation 154 (e.g., well) that includes cracks 156. The solid particles (e.g., proppants) from HP fluid out 150 may be provided into the cracks 156 of the rock formation.

In some embodiments, LP fluid out 140, LP out flow valve 141, high pressure fluid pumps 134, HP in flow valve 131, and HP fluid in 130 are part of a first loop (e.g., proppant free fluid loop). The LP fluid out 140 may be provided to the high pressure fluid pumps 134 to generate HP fluid in 130 that becomes LP fluid out 140 upon exiting the hydraulic energy transfer system 110.

In some embodiments, LP fluid in 120, HP fluid out 150, and low pressure fluid pumps 124 are part of a second loop (e.g., proppant containing fluid loop). The HP fluid out 150 may be provided into the rock formation 154 and then pumped from the rock formation 154 by the low pressure fluid pumps 124 to generate LP fluid in 120. The controller 180 may control the low pressure fluid pumps 124. In some embodiments, the controller 180 controls HP in flow valve 131 and LP out flow valve 141.

In some embodiments, fluid handling system 100B is used in well completion operations in the oil and gas industry to perform hydraulic fracturing (e.g., fracking, fracing) to increase the release of oil and gas in rock formations 154. HP out system 152 may include rock formations 154 (e.g., a well). Hydraulic fracturing may include pumping HP fluid out 150 containing a combination of water, chemicals, and/or solid particles (e.g., sand, ceramics, proppant) into a well (e.g., rock formation 154) at high pressures. LP fluid in 120 and HP fluid out 150 may include a particulate laden fluid that increases the release of oil and gas in rock formations 154 by propagating and increasing the size of cracks 156 in the rock formations 154. The high pressures of HP fluid out 150 initiates and increases size of cracks 156 and propagation through the rock formation 154 to release more oil and gas, while the solid particles (e.g., powders, debris, etc.) enter the cracks 156 to keep the cracks 156 open (e.g., prevent the cracks 156 from closing once HP fluid out 150 is depressurized).

In order to pump this particulate laden fluid into the rock formation 154 (e.g., a well), the fluid handling system 1009 may include one or more high pressure fluid pumps 134 and/or one or more low pressure fluid pumps 124 coupled to the hydraulic energy transfer system 110. For example, the hydraulic energy transfer system 110 may be a hydraulic turbocharger or a PX (e.g., a rotary PX). In operation, the hydraulic energy transfer system 110 transfers pressures without any substantial mixing between a first fluid (e.g., HP fluid in 130, proppant free fluid) pumped by the high pressure fluid pumps 134 and a second fluid (e.g., LP fluid in 120, proppant containing fluid, frac fluid, fluid pumped by the low pressure fluid pumps 124, fluid that his gravity-fed, etc.). In this manner, the hydraulic energy transfer system 110 blocks or limits wear on the high pressure fluid pumps 134, while enabling the fluid handling system 100B to pump a high-pressure frac fluid (e.g., HP fluid out 150) into the rock formation 154 to release oil and gas. In order to operate in corrosive and abrasive environments, the hydraulic energy transfer system 110 may be made from materials resistant to corrosive and abrasive substances in either the first and second fluids. For example, the hydraulic energy transfer system 110 may be made out of ceramics (e.g., alumina, cermets, such as carbide, oxide, nitride, or boride hard phases) within a metal matrix (e.g., Co, Cr or Ni or any combination thereof) such as tungsten carbide in a matrix of CoCr, Ni, NiCr or Co.

In some embodiments, the hydraulic energy transfer system 110 includes a PX (e.g., rotary PX) and HP fluid in 130 (e.g., the first fluid, high-pressure solid particle free fluid) enters via a first inlet of the PX where the HP fluid in 130 contacts LP fluid in 120 (e.g., the second fluid, low-pressure frac fluid) entering the PX via a second inlet. The contact between the fluids and/or the contact of the fluids with a component of the PX (e.g., a piston, a turbine wheel, a compressor wheel, etc.) enables the HP fluid in 130 to increase the pressure of the second fluid (e.g., LP fluid in 120), which drives the second fluid out (e.g., HP fluid out 150) of the PX and down a well (e.g., rock formation 154) for fracturing operations. The first fluid (e.g., LP fluid out 140) similarly exits the PX, but at a low pressure after exchanging pressure with the second fluid. The second fluid may be a low-pressure frac fluid that may include abrasive particles.

Fluid handling system 100B may further include one or more sensors configured to provide sensor data associated with the first and second fluids. HP in flow valve 131 may control a flowrate of HP fluid in 130 based on sensor data received from a sensor providing sensor data associated with the flow of HP fluid in 130. HP in flow valve 131 may control a flowrate of HP fluid in 130 based on a target flowrate. The target flowrate may be determined by controller 108 based on user input provided by a user (e.g., a technician, operator, engineer, etc.). LP out flow valve 141 may control a flowrate of LP fluid out 140 (e.g., which causes control of a flowrate of LP fluid in 120) based on sensor data received from the one or more sensors. In some embodiments, controller 180 causes HP in flow valve 131 and/or LP out flow valve 141 to actuate based on sensor data received.

Figure 1C:
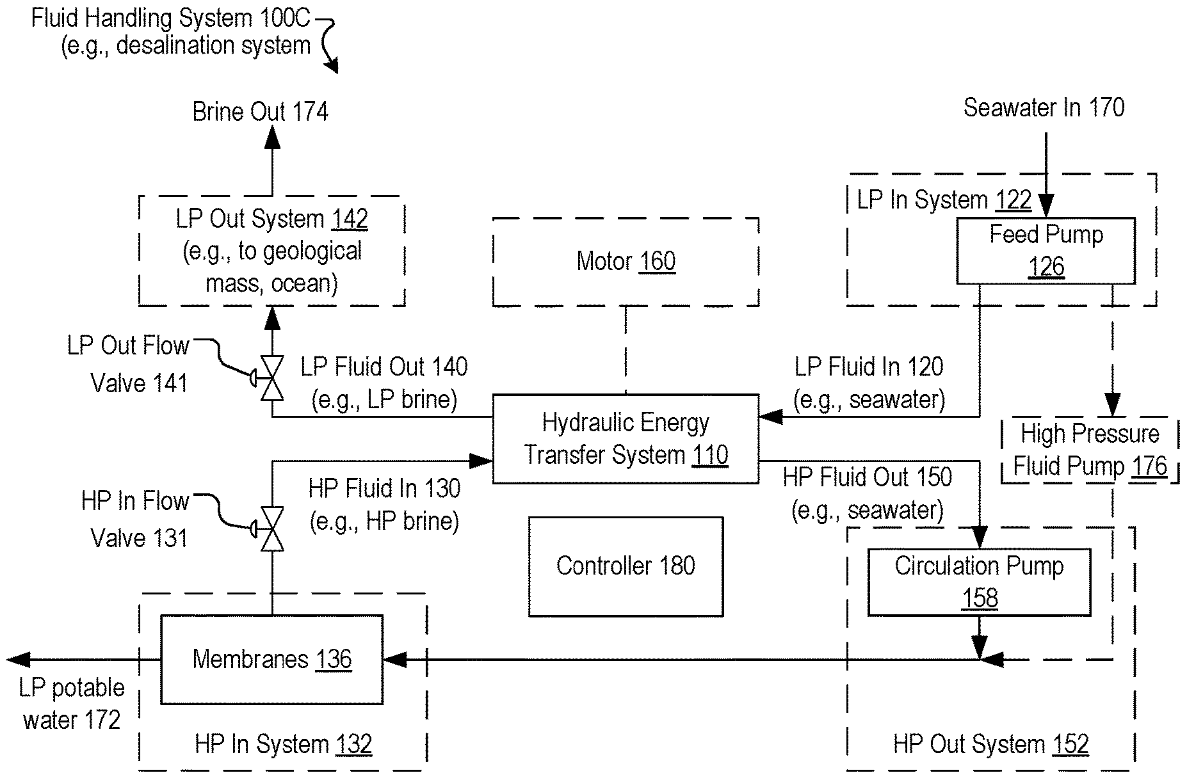

FIG. 1C illustrates a schematic diagram of a fluid handling system 100C including a hydraulic energy transfer system 110, according to certain embodiments. Fluid handling system 100C may be a desalination system (e.g., remove salt and/or other minerals from water). In some embodiments, fluid handling system 100C includes more components, less components, same routing, different routing, and/or the like than that shown in FIG. 1C. Some of the features in FIG. 1C that have similar reference numbers as those in FIG. 1A and/or FIG. 1B may have similar properties, functions, and/or structures as those in FIG. 1A and/or FIG. 1B.

LP in system 122 may include a feed pump 126 (e.g., low pressure fluid pump 124) that receives seawater in 170 (e.g., feed water from a reservoir or directly from the ocean) and provides LP fluid in 120 (e.g., low pressure seawater, feed water) to hydraulic energy transfer system 110 (e.g., PX). Feed pump 126 may be controlled by controller 180. HP in system 132 may include membranes 136 that provide HP fluid in 130 (e.g., high pressure brine) to hydraulic energy transfer system 110 (e.g., PX) via HP in flow valve 131. The hydraulic energy transfer system 110 exchanges pressure between the HP fluid in 130 and LP fluid in 120 to provide HP fluid out 150 (e.g., high pressure seawater) to HP out system 152 and to provide LP fluid out 140 (e.g., low pressure brine) to LP out system 142 (e.g., geological mass, ocean, sea, discarded, etc.) via LP out flow valve 141.

The membranes 136 may be a membrane separation device configured to separate fluids traversing a membrane, such as a reverse osmosis membrane. Membranes 136 may provide HP fluid in 130 which is a concentrated feed-water or concentrate (e.g., brine) to the hydraulic energy transfer system 110. Pressure of the HP fluid in 130 may be used to compress low-pressure feed water (e.g., LP fluid in 120) to be high pressure feed water (e.g., HP fluid out 150). For simplicity and illustration purposes, the term feed water is used. However, fluids other than water may be used in the hydraulic energy transfer system 110.

The circulation pump 158 (e.g., turbine) provides the HP fluid out 150 (e.g., high pressure seawater) to membranes 136. The circulation pump 158 may be controlled by controller 180. The membranes 136 filter the HP fluid out 150 to provide LP potable water 172 and HP fluid in 130 (e.g., high pressure brine). The LP out system 142 provides brine out 174 (e.g., to geological mass, ocean, sea, discarded, etc.).

In some embodiments, a high pressure fluid pump 176 is disposed between the feed pump 126 and the membranes 136. The high pressure fluid pump 176 increases pressure of the low pressure seawater (e.g., LP fluid in 120, provides high pressure feed water) to be mixed with the high pressure seawater provided by circulation pump 158. The high pressure fluid pump 176 may be controlled by controller 180.

In some embodiments, use of the hydraulic energy transfer system 110 decreases the load on high pressure fluid pump 176. In some embodiments, fluid handling system 100C provides LP potable water 172 without use of high pressure fluid pump 176. In some embodiments, fluid handling system 100C provides LP potable water 172 with intermittent use of high pressure fluid pump 176.

In some examples, hydraulic energy transfer system 110 (e.g., PX) receives LP fluid in 120 (e.g., low-pressure feed-water) at about 30 pounds per square inch (PSI) and receives HP fluid in 130 (e.g., high-pressure brine or concentrate) at about 980 PSI. The hydraulic energy transfer system 110 (e.g., PX) transfers pressure from the high-pressure concentrate (e.g., HP fluid in 130) to the low-pressure feed-water (e.g., LP fluid in 120). The hydraulic energy transfer system 110 (e.g., PX) outputs HP fluid out 150 (e.g., high pressure (compressed) feed-water) at about 965 PSI and LP fluid out 140 (e.g., low-pressure concentrate) at about 15 PSI. Thus, the hydraulic energy transfer system 110 (e.g., PX) may be about 97% efficient since the input volume is substantially equal to the output volume of the hydraulic energy transfer system 110 (e.g., PX), and 965 PSI is substantially 97% of 980 PSI.

Fluid handling system 100C may further include one or more sensors configured to provide sensor data associated with the first and second fluids. HP in flow valve 131 may control a flowrate of HP fluid in 130 based on sensor data received from a sensor providing sensor data associated with the flow of HP fluid in 130. HP in flow valve 131 may control a flow rate of HP fluid in 130 based on a target flowrate. The target flowrate may be determined by controller 108 based on user input provided by a user (e.g., a technician, operator, engineer, etc.). LP out flow valve 141 may control a flowrate of LP fluid out 140 (e.g., which causes control of a flowrate of LP fluid in 120) based on sensor data received from the one or more sensors. In some embodiments, controller 180 causes HP in flow valve 131 and/or LP out flow valve 141 to actuate based on sensor data received.

Figure 1D:
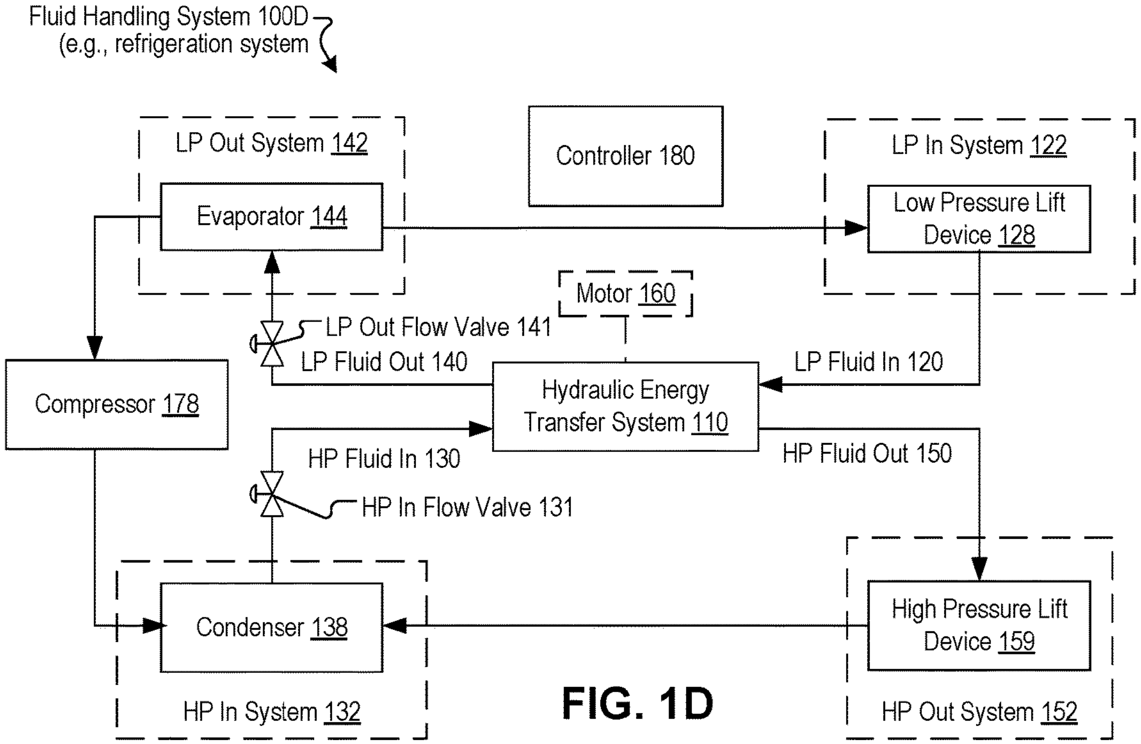

FIG. 1D illustrates a schematic diagram of a fluid handling system 100D including a hydraulic energy transfer system 110, according to certain embodiments. Fluid handling system 100D may be a refrigeration system. In some embodiments, fluid handling system 100D includes more components, less components, same routing, different routing, and/or the like than that shown in FIG. 1D. Some of the features in FIG. 1D that have similar reference numbers as those in FIG. 1A, FIG. 1B, and/or FIC. 1B may have similar properties, functions, and/or structures as those in FIG. 1A, FIG. 1B, and/or FIG. 1C.

Hydraulic energy transfer system 110 (e.g., PX) may receive LP fluid in 120 from LP in system 122 (e.g., low pressure lift device 128, low pressure fluid pump, low pressure compressor, etc.) and HP fluid in 130 from HP in system 132 (e.g., condenser 138, gas cooler, heat exchanger, etc.) via HP in flow valve 131. The hydraulic energy transfer system 110 (e.g., PX) may exchange pressure between the LP fluid in 120 and HP fluid in 130 to provide HP fluid out 150 to HP out system 152 (e.g., high pressure lift device 159, high pressure fluid pump, high pressure compressor, etc.) and to provide LP fluid out 140 to LP out system 142 (e.g., evaporator 144, heat exchanger, etc.) via LP out flow valve 141. The evaporator 144 may provide the fluid to compressor 178 and low pressure lift device 128. The condenser 138 may receive fluid from compressor 178 and high pressure lift device 159. Controller 180 may control one or more components of fluid handling system 100D.

The fluid handling system 100D may be a closed system. LP fluid in 120, HP fluid in 130, LP fluid out 140, and HP fluid out 150 may all be a fluid (e.g., refrigerant, the same fluid) that is circulated in the closed system of fluid handling system 100D.

In some embodiments, the fluid of fluid handling system 100D may include solid particles. For example, the piping, equipment, connections (e.g., pipe welds, pipe soldering), etc. may introduce solid particles (e.g., solid particles from the welds, solders, and/or corrosion) into the fluid in the fluid handling system 100D.

Fluid handling system 100D may additionally include one or more sensors configured to provide sensor data associated with the fluid. HP in flow valve 131 may control a flowrate of HP fluid in 130 based on sensor data received from a sensor providing sensor data associated with the flow of HP fluid in 130. HP in flow valve 131 may control a flowrate of HP fluid in 130 based on a target flowrate. The target flowrate may be determined by controller 108 based on user input provided by a user (e.g., a technician, operator, engineer, etc.). LP out flow valve 141 may control a flowrate of LP fluid out 140 (e.g., which causes control of a flowrate of LP fluid in 120) based on sensor data received from the one or more sensors. In some embodiments, controller 180 causes HP in flow valve 131 and/or LP out flow valve 141 to actuate based on sensor data received.

FIGS. 2A-E are exploded perspective views a rotary PX 40 (e.g., rotary pressure exchanger, rotary liquid piston compressor (LPC)), according to certain embodiments. Some of the features in one or more of FIGS. 2A-E may have similar properties, functions, and/or structures as those in one or more of FIGS. 1A-D.

PX 40 is configured to transfer pressure and/or work between a first fluid (e.g., particle free fluid, non-caustic fluid, non-acidic fluid, proppant free fluid or supercritical carbon dioxide, HP fluid in 130) and a second fluid (e.g., slurry fluid, caustic fluid, acidic fluid, frac fluid or superheated gaseous carbon dioxide, LP fluid in 120) with minimal mixing of the fluids. The rotary PX 40 may include a generally cylindrical body portion 42 that includes a sleeve 44 (e.g., rotor sleeve) and a rotor 46. The rotary PX 40 may also include two end caps 48 and 50 that include manifolds 52 and 54, respectively. Manifold 52 includes respective inlet port 56 and outlet port 58, while manifold 54 includes respective inlet port 60 and outlet port 62. In operation, these inlet ports 56, 60 enable the first and second fluids to enter the rotary PX 40 to exchange pressure, while the outlet ports 58, 62 enable the first and second fluids to then exit the rotary PX 40. In operation, the inlet port 56 may receive a high-pressure first fluid (e.g., HP fluid in 130), and after exchanging pressure, the outlet port 58 may be used to route a low-pressure first fluid (e.g., LP fluid out 140) out of the rotary PX 40. Similarly, the inlet port 60 may receive a low-pressure second fluid (e.g., low pressure slurry fluid, LP fluid in 120) and the outlet port 62 may be used to route a high-pressure second fluid (e.g., high pressure slurry fluid, HP fluid out 150) out of the rotary PX 40. The end caps 48 and 50 include respective end covers 64 and 66 (e.g., end plates) disposed within respective manifolds 52 and 54 that enable fluid sealing contact with the rotor 46.

One or more components of the PX 40, such as the rotor 46, the end cover 64, and/or the end cover 66, may, be constructed from a wear-resistant material (e.g., carbide, cemented carbide, silicon carbide, tungsten carbide, etc.) with a hardness greater than a predetermined threshold (e.g., a Vickers hardness number that is at least 1000, 1250, 1500, 1750, 2000, 2250, or more). For example, tungsten carbide may be more durable and may provide improved wear resistance to abrasive fluids as compared to other materials, such as alumina ceramics. Additionally, in some embodiments, one or more components of the PX 40, such as the rotor 46, the end cover 64, the end cover 66, and/or other sealing surfaces of the PX 40, may include an insert. In some embodiments, the inserts may be constructed from one or more wear-resistant materials (e.g., carbide, cemented carbide, silicon carbide, tungsten carbide, etc.) with a hardness greater than a predetermined threshold (e.g., a Vickers hardness number that is at least 1000, 1250, 1500, 1750, 2000, 2250, or more) to provide improved wear resistance.

The rotor 46 may be cylindrical and disposed in the sleeve 44, which enables the rotor 46 to rotate about the axis 68. The rotor 46 may have a plurality of channels 70 (e.g., ducts, rotor ducts) extending substantially longitudinally through the rotor 46 with openings 72 and 74 (e.g., rotor ports) at each end arranged symmetrically about the longitudinal axis 68. The openings 72 and 74 of the rotor 46 are arranged for hydraulic communication with inlet and outlet apertures 76 and 78 (e.g., end cover inlet port and end cover outlet port) and 80 and 82 (e.g., end cover inlet port and end cover outlet port) in the end covers 64 and 66, in such a manner that during rotation the channels 70 are exposed to fluid at high-pressure and fluid at low-pressure. As illustrated, the inlet and outlet apertures 76 and 78 and 80 and 82 may be designed in the form of arcs or segments of a circle (e.g., C-shaped).

In some embodiments, a controller (e.g., controller 180 of FIGS. 1A-D) using sensor data (e.g., revolutions per minute measured through a tachometer or optical encoder or volumetric flow rate measured through flowmeter) may control the extent of mixing between the first and second fluids in the rotary PX 40, which may be used to improve the operability of the fluid handling system (e.g., fluid handling systems 100A-D of FIGS. 1A-D). For example, varying the volumetric flow rates of the first and/or second fluids entering the rotary PX 40 (e.g., by HP in flow valve 131 and LP out flow valve 141 of FIGS. 1A-1D) allows the plant operator (e.g., system operator) to control the amount of fluid mixing within the PX 40. In addition, varying the rotational speed of the rotor 46 (e.g., via a motor) also allows the operator to control mixing. Three characteristics of the rotary PX 40 that affect mixing are: (1) the aspect ratio of the rotor channels 70; (2) the duration of exposure between the first and second fluids; and (3) the creation of a fluid barrier (e.g., an interface) between the first and second fluids within the rotor channels 70. First, the rotor channels 70 (e.g., ducts) are generally long and narrow, which stabilizes the flow within the rotary PX 40. In addition, the first and second fluids may move through the channels 70 in a plug flow regime with minimal axial mixing. Second, in certain embodiments, the speed of the rotor 46 reduces contact between the first and second fluids. For example, the speed of the rotor 46 (e.g., rotor speed of approximately 1200 revolutions per minute (RPM)) may reduce contact times between the first and second fluids to less than approximately 0.15 seconds, 0.10 seconds, or 0.05 seconds. Third, a small portion of the rotor channel 70 is used for the exchange of pressure between the first and second fluids. Therefore, a volume of fluid remains in the channel 70 as a barrier between the first and second fluids. All these mechanisms may limit mixing within the rotary PX 40. Moreover, in some embodiments, the rotary PX 40 may be designed to operate with internal pistons or other barriers, either complete or partial, that isolate the first and second fluids while enabling pressure transfer.

FIGS. 2B-2E are exploded views of an embodiment of the rotary PX 40 illustrating the sequence of positions of a single rotor channel 70 in the rotor 46 as the channel 70 rotates through a complete cycle. It is noted that FIGS. 2B-2E are simplifications of the rotary PX 40 showing one rotor channel 70, and the channel 70 is shown as having a circular cross-sectional shape. In other embodiments, the rotary PX 40 may include a plurality of channels 70 with the same or different cross-sectional shapes (e.g., circular, oval, square, rectangular, polygonal, etc.). Thus, FIGS. 2B-2E are simplifications for purposes of illustration, and other embodiments of the rotary PX 40 may have configurations different from those shown in FIGS. 2A-2E. As described in detail below, the rotary PX 40 facilitates pressure exchange between first and second fluids (e.g., a particulate-free fluid and a slurry fluid) by enabling the first and second fluids to briefly contact each other within the rotor 46. In some embodiments, the PX facilitates pressure exchange between first and second fluids by enabling the first and second fluids to contact opposing sides of a barrier (e.g., a reciprocating barrier, a piston, not shown). In certain embodiments, this exchange happens at speeds that result in limited mixing of the first and second fluids. The speed of the pressure wave traveling through the rotor channel 70 (as soon as the channel is exposed to the aperture 76), the diffusion speeds of the fluids, and/or the rotational speed of rotor 46 may dictate whether any mixing occurs and to what extent.

Figure 2A:
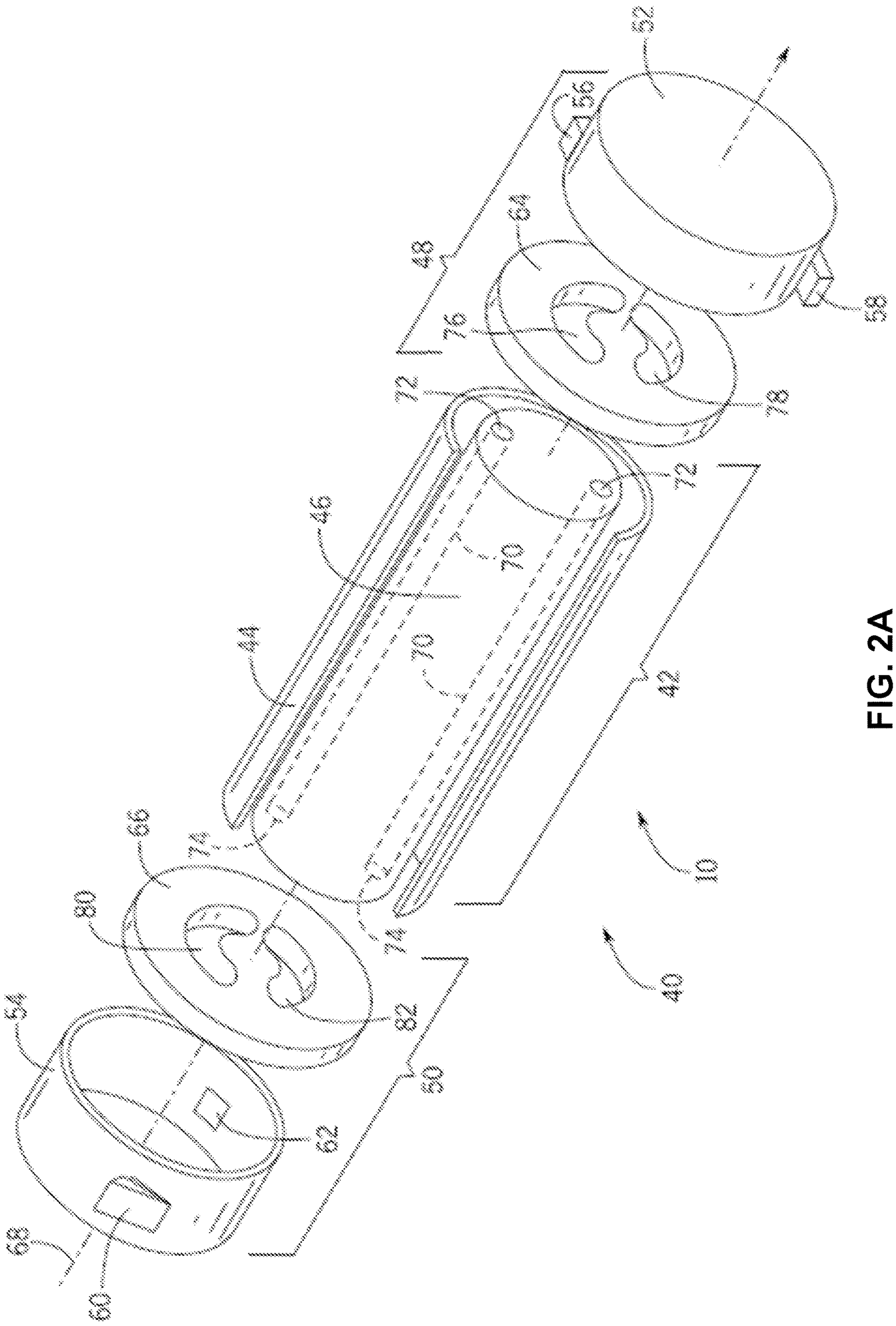
FIGS. 2A-E are exploded perspective views of pressure exchangers (PXs), according to certain embodiments.
Figure 2B:
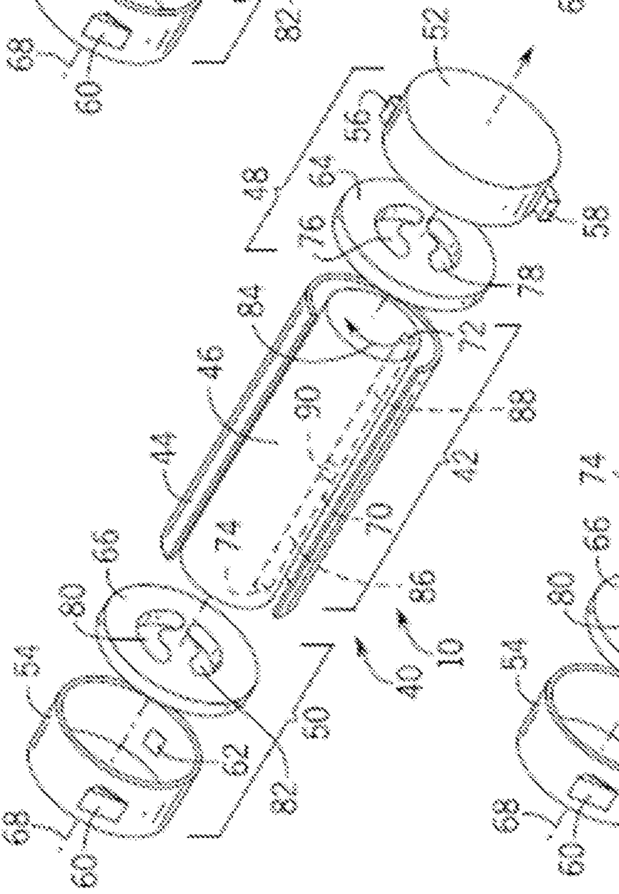

FIG. 2B is an exploded perspective view of an embodiment of a rotary PX 40 (e.g., rotary LPC), according to certain embodiments. In FIG. 2B, the channel opening 72 is in a first position. In the first position, the channel opening 72 is in fluid communication with the aperture 78 in end cover 64 and therefore with the manifold 52, while the opposing channel opening 74 is in hydraulic communication with the aperture 82 in end cover 66 and by extension with the manifold 54. The rotor 46 may rotate in the clockwise direction indicated by arrow 84. In operation, low-pressure second fluid 86 (e.g., low pressure slurry fluid) passes through end cover 66 and enters the channel 70, where it contacts the first fluid 88 at a dynamic fluid interface 90. The second fluid 86 then drives the first fluid 88 out of the channel 70, through end cover 64, and out of the rotary PX 40. However, because of the short duration of contact, there is minimal mixing between the second fluid 86 (e.g., slurry fluid) and the first fluid 88 (e.g., particulate-free fluid). In some embodiments, low pressure second fluid 86 contacts a first side of a barrier (e.g., a piston, not shown) disposed in channel 70 that is in contact (e.g., on an opposing side of the barrier) by first fluid 88. The second fluid 86 drives the barrier which pushes first fluid 88 out of the channel 70. In such embodiments, there is negligible mixing between the second fluid 86 and the first fluid 88.

Figure 2C:
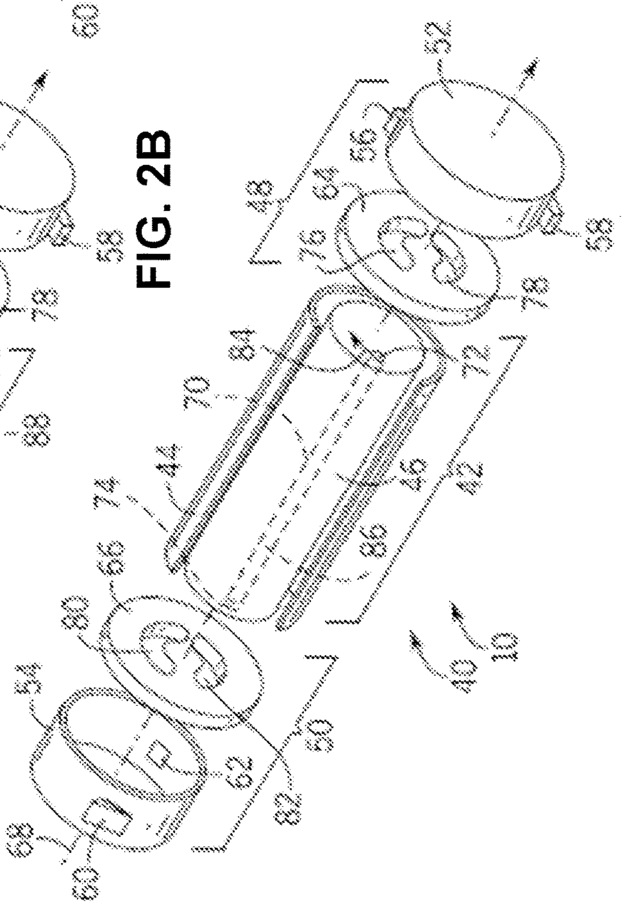

FIG. 2C is an exploded perspective view of an embodiment of a rotary PX 40 (e.g., rotary LPC), according to certain embodiments. In FIG. 2C, the channel 70 has rotated clockwise through an arc of approximately 90 degrees. In this position, the opening 74 (e.g., outlet) is no longer in fluid communication with the apertures 80 and 82 of end cover 66, and the opening 72 is no longer in fluid communication with the apertures 76 and 78 of end cover 64. Accordingly, the low-pressure second fluid 86 is temporarily contained within the channel 70.

Figure 2D:
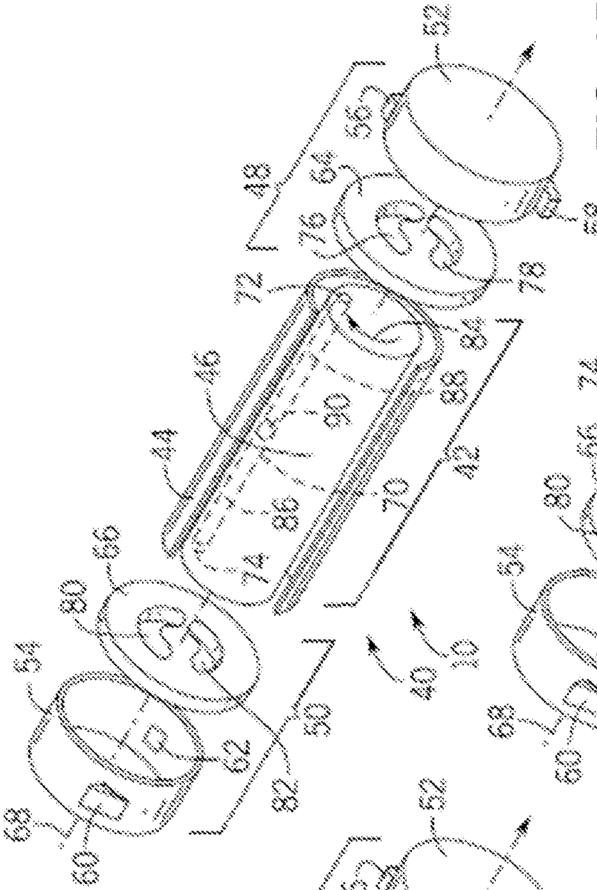

FIG. 2D is an exploded perspective view of an embodiment of a rotary PX 40 (e.g., rotary LPC), according to certain embodiments. In FIG. 2D, the channel 70 has rotated through approximately 60 degrees of arc from the position shown in FIG. 2B. The opening 74 is now in fluid communication with aperture 80 in end cover 66, and the opening 72 of the channel 70 is now in fluid communication with aperture 76 of the end cover 64. In this position, high-pressure first fluid 88 enters and pressurizes the low-pressure second fluid 86, driving the second fluid 86 out of the rotor channel 70 and through the aperture 80.

Figure 2E:
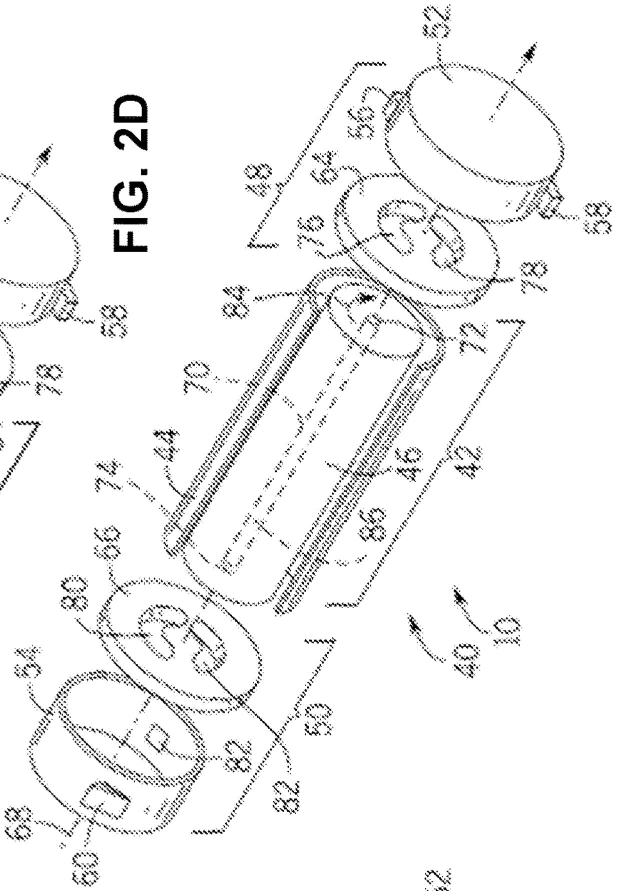

FIG. 2E is an exploded perspective view of an embodiment of a rotary PX 40 (e.g., rotary LPC), according to certain embodiments. In FIG. 2E, the channel 70 has rotated through approximately 270 degrees of arc from the position shown in FIG. 2B. In this position, the opening 74 is no longer in fluid communication with the apertures 80 and 82 of end cover 66, and the opening 72 is no longer in fluid communication with the apertures 76 and 78 of end cover 64. Accordingly, the first fluid 88 is no longer pressurized and is temporarily contained within the channel 70 until the rotor 46 rotates another 90 degrees, starting the cycle over again.

FIGS. 3A-D are schematic diagrams of fluid handling systems 300A-D including PXs, according to certain embodiments. Some of the features in one or more of FIGS. 3A-D may have similar properties, functions, and/or structures as those in one or more of FIGS. 1A-D and/or one or more of FIGS. 2A-E.

Figure 3A:
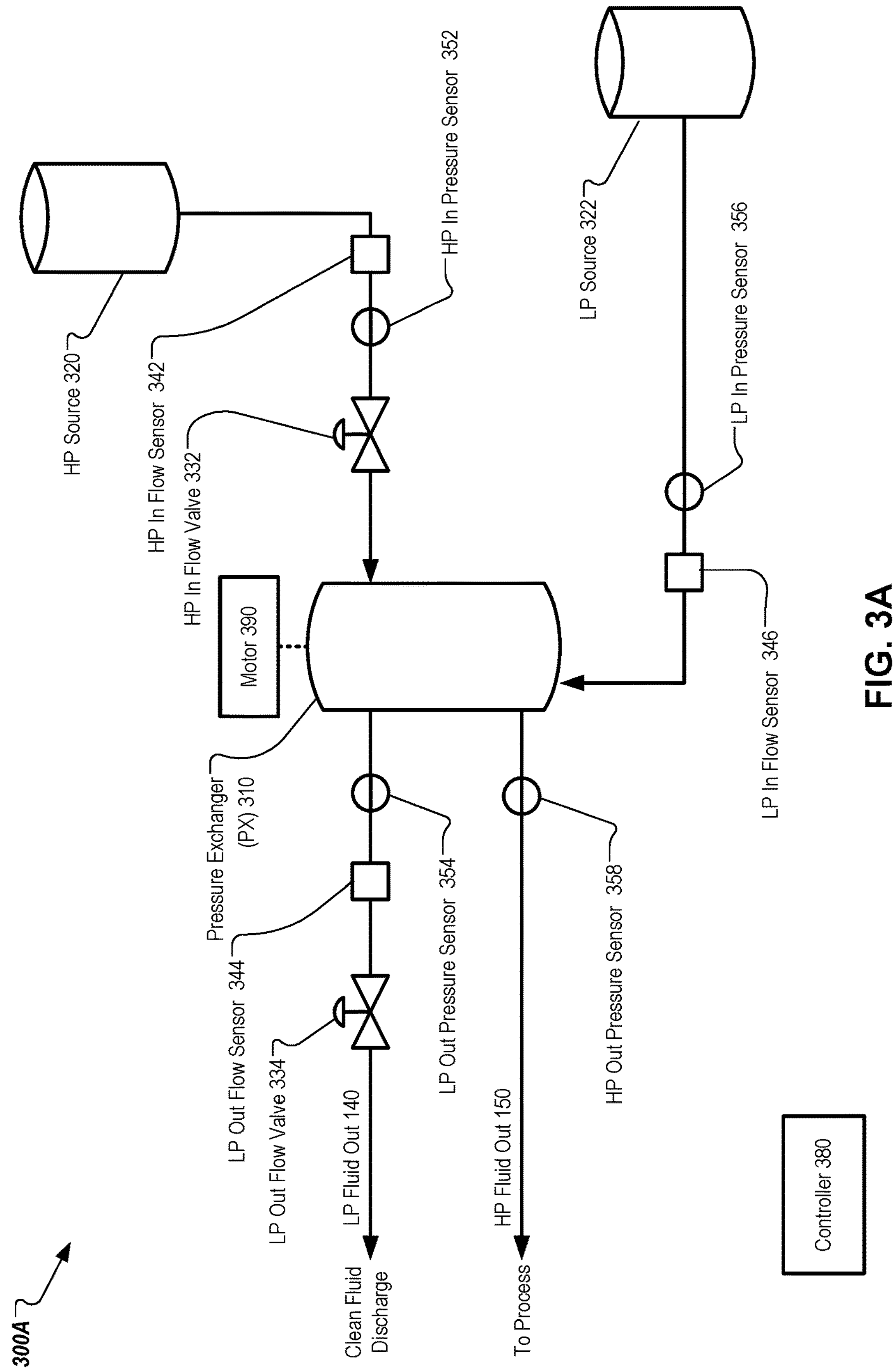
FIGS. 3A-D are schematic diagrams of fluid handling systems including PXs, according to certain embodiments.

FIG. 3A is a schematic diagram of a fluid handling system 300A including a pressure exchanger (PX), according to certain embodiments. In some embodiments, fluid handling system includes a pressure exchanger (PX) 310. PX 310 may be a rotary pressure exchanger. In some embodiments, PX 310 is an isobaric or substantially isobaric pressure exchanger. PX 310 may be configured to exchange pressure between a first fluid and a second fluid. In some embodiments, PX 310 is coupled to a motor 390 (e.g., rotation of rotor of PX 310 is controlled by the motor 390).

In some embodiments, fluid handling system 300A includes a high pressure (HP) source 320 (e.g., HP in system 132 of one or more of FIGS. 1A-D) and a low pressure (LP) source 322 (e.g., LP in system 122 of one or more of FIGS. 1A-D). HP source 320 may be a source of a first fluid. The first fluid may be a particle-free fluid (e.g., water, proppant-free fluid, filtered fluid, etc.). In some embodiments, the first fluid is a non-caustic fluid (e.g., a non-alkaline fluid, a fluid having a pH between approximately 5 and 10). In some embodiments, the first fluid is a non-acidic fluid. HP source 320 may include one or more high pressure pumps to supply the first fluid at high pressure. LP source 322 may be a source of a second fluid. The second fluid may be a particle-laden fluid (e.g., a slurry fluid, frac fluid, etc.). The second fluid may contain abrasives and/or solid particles. In some embodiments, the second fluid is a caustic fluid (e.g., a strong base fluid, a fluid having a pH greater than approximately 10, etc.). In some embodiments, the second fluid is an acidic fluid (e.g., a strong acid fluid, a fluid having a pH less than approximately 5, etc.). In some embodiments, the first fluid may include particles and the second fluid may be a substantially particle-free fluid.

Fluid handling system 300A may include a controller 380 (e.g., controller 180 of FIGS. 1A-D). Controller 380 may control the pumps and/or valves of system 300A. Controller 380 may receive sensor data from one or more sensors of system 300A. In some embodiments, controller 380 controls motor 390. In some embodiments, controller 380 receives motor data from one or more motor sensors associated with motor 390. Motor data received from motor sensors may include current motor speed (e.g., revolutions per minute), total motor run time, motor run time between maintenance operations, and/or total motor revolutions. Motor data may be indicative of a performance state of motor 390.

In some embodiments, PX 310 is to receive the first fluid at a high pressure (e.g., HP fluid in 130 of FIGS. 1A-D). PX 310 may receive the first fluid via a high pressure inlet. In some embodiments, PX 310 is to receive the second fluid at a low pressure (e.g., LP fluid in 120 of FIGS. 1A-D). PX 310 may receive the second fluid via a low pressure inlet. Although there is a reference to "high pressure" and "low pressure," "high pressure" and "low pressure" may be relative to one another and may not connote certain pressure values (e.g., the pressure of the HP fluid in 130 is higher than the pressure of LP fluid in 120). PX 310 may exchange pressure between the first fluid and the second fluid. PX 310 may provide the first fluid via a low pressure outlet (e.g., LP fluid out 140) and may provide the second fluid via a high pressure outlet (e.g., HP fluid out 150). In some embodiments, the first fluid provided via the low pressure outlet is at a low pressure and the second fluid provided via the high pressure outlet is at a high pressure.

Fluid handling system 300A may include one or more valves. In some embodiments, fluid handling system 300A includes HP in flow valve 332 (e.g., HP in flow valve 131 of one or more of FIGS. 1A-D) and LP out flow valve 334 (e.g., LP out flow valve 141 of one or more of FIGS. 1A-D). HP in flow valve 332 may be fluidly coupled to the first inlet (e.g., the high pressure inlet) of PX 310. HP in flow valve 332 may be fluidly coupled to HP source 320. HP in flow valve 332 may receive high pressure first fluid from HP source 320 and provide the high pressure first fluid to the high pressure inlet of PX 310. HP in flow valve 332 may be upstream of the high pressure inlet of PX 310. HP in flow valve 332 may regulate a flowrate of the high pressure first fluid provided to the PX 310 via the high pressure inlet.

LP out flow valve 334 may be fluidly coupled to the first outlet (e.g., the low pressure outlet) of PX 310. LP out flow valve 334 may receive low pressure first fluid from the low pressure outlet of PX 310 and provide the low pressure fluid to a clean fluid discharge. LP out flow valve 334 may be downstream of the low pressure outlet of PX 310. LP out flow valve 334 may regulate a flowrate of the first fluid from the low pressure outlet of PX 310. In some embodiments, by nature of pressure exchanger systems (e.g., fluid handling system 300A), regulating a flowrate of the low pressure first fluid from the low pressure outlet of PX 310 also regulates a flowrate of the low pressure second fluid into the low pressure inlet of PX 310.

Fluid handling system 300A may include one or more sensors. In some embodiments, fluid handling system 300A includes one or more flow sensors (e.g., volumetric flow rate sensors, mass flow rate sensors, velocity sensors, etc.) and/or pressure sensors. In some embodiments, flow sensors of fluid handling system 300A include HP in flow sensor 342, LP out flow sensor 344, and/or LP in flow sensor 346. HP in flow sensor 342 may detect a flowrate of the high pressure first fluid into the high pressure inlet of PX 310. LP in flow sensor 346 may detect a flowrate of the low pressure second fluid into the low pressure inlet of PX 310. LP out flow sensor 344 may detect a flowrate of the low pressure first fluid subsequent to the low pressure first fluid exiting the low pressure outlet of PX 310. Controller 380 may receive sensor data from HP in flow sensor 342, LP in flow sensor 346, and/or LP out flow sensor 344.

In some embodiments, pressure sensors of fluid handling system 300A include HP in pressure sensor 352, LP in pressure sensor 356, LP out pressure sensor 354, and/or HP out pressure sensor 358. HP in pressure sensor 352 may detect a pressure of high pressure first fluid flowing to the high pressure inlet of PX 310. LP in pressure sensor 356 may detect a pressure of low pressure second fluid flowing to the low pressure inlet of PX 310. LP out pressure sensor 354 may detect a pressure of low pressure first fluid flowing from the low pressure outlet of PX 310. HP out pressure sensor 358 may detect a pressure of high pressure second fluid flowing from the high pressure outlet of PX 310.

Controller 380 may receive sensor data from the sensors of system. In some embodiments, controller 380 receives user input associated with a target flowrate of the high pressure first fluid. For example, controller 380 may receive user input (e.g., from a client device, from a user) indicating that a target flowrate of the high pressure first fluid is to be 300 gallons per minute.

The flowrates of the first fluid and the second fluid to the PX may be controlled by controller 380. In some embodiments, the controller 380 is configured to control the flowrates of the first and second fluids by actuating control valves (e.g., HP in flow valve 332 and LP out flow valve 334) fluidly coupled to PX 310. In some embodiments, the controller 380 controls one or more corresponding supply pumps that are configured to supply the first fluid and/or second fluid to PX 310 (e.g., a high pressure pump of HP source 320 to provide the first fluid and/or a low pressure pump of LP source 322 to provide the second fluid). For example, controller 380 may control a high-pressure supply pump which is to supply the first fluid to the high pressure inlet. Controller 380 may control a low pressure supply pump which is to supply the second fluid to the low pressure inlet. In some embodiments, controller 380 controls HP in flow valve 332 to regulate the flow of the first fluid into the high pressure inlet. In some embodiments, controller 380 controls LP out flow valve 334 to regulate the flow of the first fluid out of PX 310 and, by nature of PX 310, the flow of the second fluid into the low-pressure inlet.

Controller 380 may receive user input associated with a target flowrate of the first fluid into the high pressure inlet. For example, the user input may indicate a target flowrate of the first fluid of 300 gallons per minute. The user input may be from a user (e.g., provided by an operator, technician, engineer, etc.). The user input may be provided by the user via a graphical user interface (GUI) of a computer system (e.g., client device) that is in communication with controller 380.

Controller 380 may cause an adjustment of a flowrate of the first fluid to be provided via high pressure inlet based on user input and sensor data from one or more of HP in pressure sensor 352 or HP in flow sensor 342. In some embodiments, controller 380 causes the adjustment by causing HP in flow valve 332 to open or close. For example, sensor data from HP in flow sensor 342 indicates that the flowrate of the first fluid to the high pressure inlet is less than the target flowrate indicated by the user input, controller 380 may cause HP in flow valve 332 to open. Opening HP in flow valve 332 may increase the flowrate of the first fluid to the high pressure inlet of PX 310. If the sensor data from HP in flow sensor 342 indicates that the flowrate of the first fluid to the high-pressure inlet is greater than the target flowrate indicated by the user input, controller 380 may cause the HP in flow valve 332 to close. Closing HP in flow valve 332 may decrease the flowrate of the first fluid to the high-pressure inlet of PX 310.

In some embodiments, controller 380 causes the adjustment of the flow rate of the high pressure first fluid by controlling a high pressure supply pump (e.g., of HP source 320). For example, when the sensor data received from the HP in flow sensor 342 indicates that the flowrate of the first fluid to the high-pressure inlet is less than the target flowrate indicated by the user input, controller 380 may cause the high-pressure supply pump to increase the pressure of the first fluid provided by the high-pressure supply pump. The high-pressure supply pump increasing the pressure of the first fluid may increase the flowrate of the first fluid to the high-pressure inlet of PX 310. If the sensor data received from HP in flow sensor 342 indicates that the flowrate of the first fluid to the high pressure inlet is greater than the target flowrate indicated by the user input, controller 380 may cause the high-pressure supply pump to decrease the pressure of the first fluid provided by the high-pressure supply pump. The high-pressure supply pump decreasing the pressure of the first fluid may decrease the flowrate of the first fluid to the high-pressure inlet of PX 310. In some embodiments, the high-pressure supply pump is a centrifugal pump. In some embodiments, the high-pressure supply pump is a positive displacement pump. The high-pressure supply pump may be configured to output the first fluid at a high pressure.

Controller 380 may cause an adjustment of the flowrate of the second fluid provided to the low pressure of PX 310 inlet based on sensor data received from one or more of HP in flow sensor 342, HP in pressure sensor 352, LP in pressure sensor 356, and/or LP in flow sensor 346. In some embodiments, controller 380 may cause an adjustment of the flowrate of the second fluid provided to the low pressure inlet based on a ratio of the flowrate of the first fluid provided to the high pressure inlet and the flowrate of the second fluid provided to the low pressure inlet. A ratio greater than one (e.g., the flowrate of the first fluid provided to the high pressure inlet is greater than the flowrate of the second fluid provided to the low pressure inlet) is referred to as a lead flow. A ratio less than one (e.g., the flowrate of the first fluid provided to the high pressure inlet is less than the flowrate of the second fluid provided to the low pressure inlet) is referred to as a lag flow. A ratio equal to one (e.g., the flowrate of the first fluid provided to the high pressure inlet is equal to the flowrate of the second fluid provided to the low pressure inlet) is referred to as a balanced flow.

In some embodiments, controller 380 causes an adjustment of the flowrate of the second fluid to the low pressure inlet of PX 310 by opening or closing LP out flow valve 334. For example, to increase the ratio of the flowrate of the first fluid to the flowrate of the second fluid to the inlets of PX 310, controller 380 may cause LP out flow valve 334 to close. Closing the LP out flow valve 334 may cause less second fluid to be supplied to the low pressure inlet of PX 310 which increases the ratio of the flowrate of the first fluid to the flowrate of the second fluid. To decrease the ratio, controller 380 may cause LP out flow valve 334 to open. Opening LP out flow valve 334 may cause the pressure (e.g. flowrate, quantity, etc.) of the second fluid supplied to the low pressure inlet to be increased which decreases the ratio of the flowrate of the first fluid to the flowrate of the second fluid. Controller 380 may cause the adjustment of the flowrate of the second fluid to the low pressure inlet of PX 310 to achieve a predetermined ratio of the flowrate of the first fluid to the flowrate of the second fluid. The predetermined ratio of the flowrate of the first fluid to the flowrate of the second fluid may be based on the amount and/or kind of particles, abrasives, contaminants, etc. in the second fluid. Operating PX 310 with a lead flow may cause less wear and undue damage on PX 310.

In some embodiments, controller 380 causes the adjustment of the flowrate of the second fluid to the low pressure inlet of PX 310 by controlling a low-pressure supply pump (e.g., of LP source 322). For example, to increase the ratio of the flowrate of the first fluid to the flowrate of the second fluid to the inlets of PX 310, controller 380 may cause the low pressure supply pump to provide the second fluid at a lower pressure (e.g., lower flowrate, lower quantity). The low pressure supply pump outputting the second fluid at a lower pressure causes the pressure of second fluid supplied to the low pressure inlet of PX 310 to be decreased which increases the ratio of the flowrate of the first fluid to the flowrate of the second fluid. To decrease the ratio of the flowrate of the first fluid to the flowrate of the second fluid, controller 380 may cause the low pressure supply pump to increase the pressure of second fluid (e.g., increase flowrate, increase quantity). The low pressure supply pump outputting second fluid at a higher pressure causes the second fluid provided to the low pressure inlet of PX 310 at an increased pressure which increases the ratio of the flowrate of the first fluid to the flowrate of the second fluid. In some embodiments, the low pressure supply pump is a centrifugal pump.

Controller 380 may be configured to cause performance of a corrective action based on sensor data (e.g., one or more of flow data received from LP out flow sensor 344, pressure data received from LP out pressure sensor 354, and/or pressure data received from HP out pressure sensor 358). In some embodiments, performance of the corrective action is based on a difference between sensor data received from LP in flow sensor 346 and sensor data received from LP out flow sensor 344 and/or a difference between sensor data received from LP in pressure sensor 356 and sensor data received from LP out pressure sensor 354. The corrective action may be causing actuation (e.g., causing an opening or closing) of one or more valves (e.g., HP in flow valve 332 and/or LP out flow valve 334). In some embodiments, flow data and pressure data received from LP out flow sensor 344 and LP out pressure sensor 354 respectively is indicative of the health of PX 310. For example, a large difference between flow data received from LP out flow sensor 344 and flow data received LP in flow sensor 346 may indicate a problem with PX 310. The problem may be due to wear of components of the PX 310 or malfunctioning components of the PX 310. In some examples, controller 380 may cause maintenance to be performed (e.g., by providing an alert, by interrupting operation, etc.) on one or more components of fluid handling system 300A (e.g., on PX 310). Pressure data received from HP out pressure sensor 358 may be used by controller 380 to control one or more pumps associated with fluid handling system 300A.

In some embodiments, LP source 322 supplies the second fluid to the low pressure inlet of PX 310 by a gravity feed. For example, an elevated reservoir (e.g., an elevated tank, a pond at an elevation higher than PX 310, etc.) may hold a supply of the second fluid. The force of gravity may cause the second fluid to be supplied to the low pressure inlet via a conduit (e.g., a pipe, etc.).

In some embodiments, after PX 310 exchanges pressure between the first fluid and the second fluid, the low pressure first fluid may be provided to a clean fluid discharge. In some embodiments, the clean fluid discharge is a reservoir (e.g., a holding pond). In some embodiments, the clean fluid discharge is fluidly connected to HP source 320, the first fluid flowing in a closed loop from HP source 320, to PX 310, to the clean fluid discharge, and back to HP source 320. The closed loop may include one or more filters to filter the first fluid after exiting PX 310 and before returning to HP source 320. After exchanging pressure between the first fluid and the second fluid, the high pressure second fluid may be provided to a process (e.g., a fracing process, a slurry pumping process, etc.).

As an example, pressure of a slurry fluid (e.g., particle-laden fluid, second fluid) is to be increased. Water (e.g., particle-free fluid, first fluid) is received by PX 310 at a high pressure. The slurry fluid is received by PX 310 at a low pressure. PX 310 exchanges pressure between the water and the slurry fluid, which raises the pressure of the slurry fluid and lowers the pressure of the water. The low pressure water is provided to a pond and the high pressure slurry fluid is provided to a slurry pipeline process. For example, a slurry pipeline process may be a process to transport solid particles via a pipeline. The solid particles (e.g., sand, etc.) are suspended in a liquid (e.g., water, etc.) to create a slurry that can be pumped through a pipeline system.

Figure 3B:
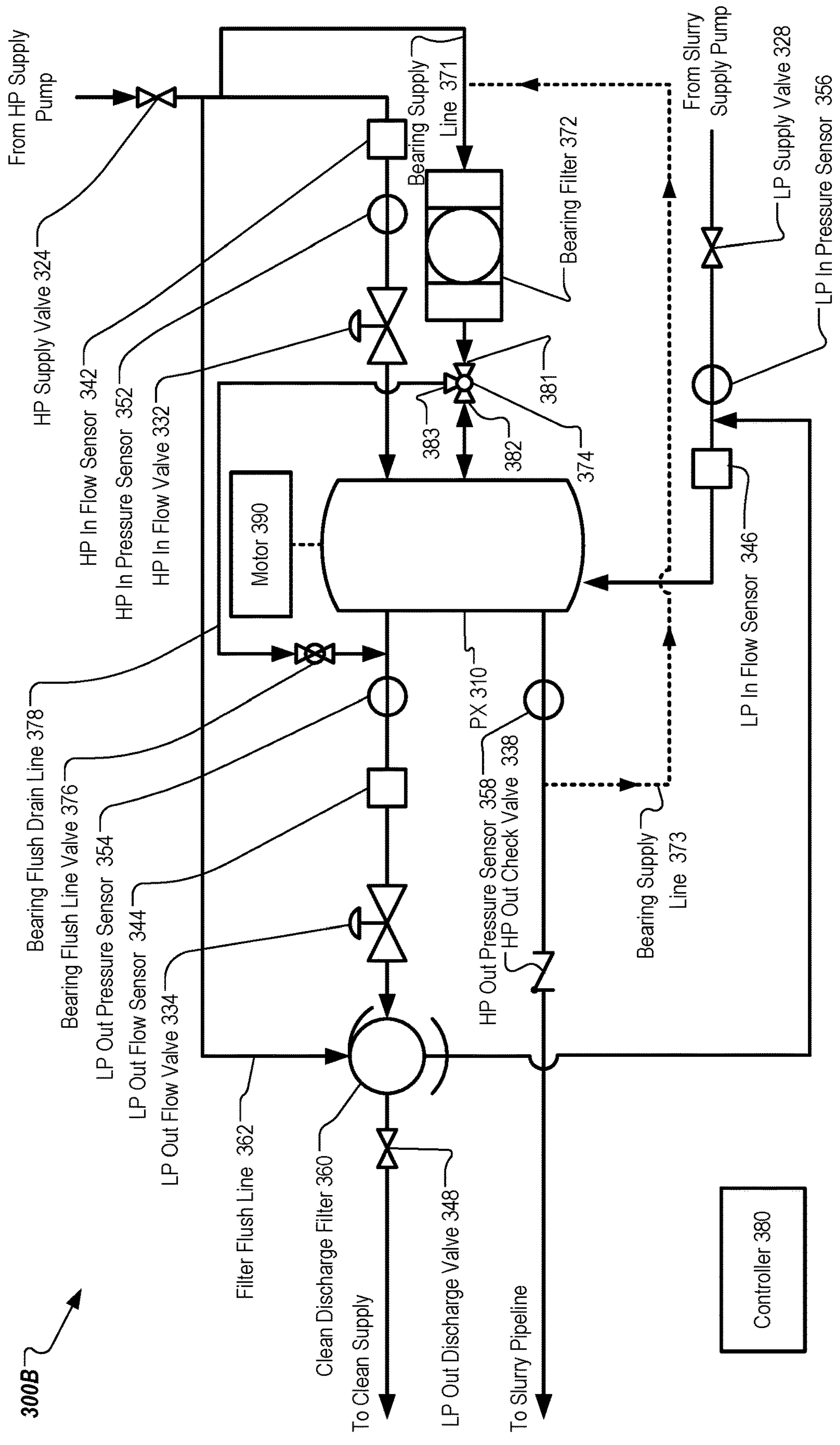

FIG. 3B is a schematic diagram of a fluid handling system 300B that includes a pressure exchanger (PX), according to certain embodiments. In some embodiments, features that have reference numbers that are similar to reference numbers in other figures include similar properties, structures, and/or functionality as those described in other figures. In some examples, features of fluid handling system 300B has similar properties, structures, and/or functionality as fluid handling system 300A of FIG. 3A.

In some embodiments, fluid handling system 300B includes one or more valves that are not shown in fluid handling system 300A. Fluid handling system 300B may include an HP supply valve 324. HP supply valve 324 may regulate a supply of high pressure first fluid from an HP supply pump (e.g., HP source 320 of FIG. 3A). System 300B may include an LP supply valve 328 to regulate a supply of low pressure second fluid from a slurry supply pump (e.g., a particle-laden fluid supply pump, a caustic fluid supply pump, an acidic fluid supply pump, LP source 322 of FIG. 3A). Fluid handling system 300B may include an HP out check valve 338 fluidly connected to and disposed downstream from the high pressure outlet of PX 310. HP out check valve 338 may cause the high pressure second fluid (e.g., a slurry fluid in fluid handling system 300B, a caustic fluid, an acidic fluid, etc.) from back-flowing (e.g., back to HP out pressure sensor 358, PX 310, etc.). The high pressure second fluid may be discharged to a slurry pipeline (e.g., a particle-laden fluid pipeline, a caustic fluid pipeline, an acidic fluid pipeline, etc.). Fluid handling system 300B may include an LP out discharge valve 348 to adjust (e.g., stop, start, increase, decrease, etc.) the flow of low pressure first fluid from the low pressure outlet of PX 310. After the first fluid passes through LP out discharge valve 348, the low pressure first fluid may be discharged to a clean supply (e.g., a reservoir of clean first fluid). LP out discharge valve 348 may be closed by a user (e.g., an operator, a technician, an engineer, etc.) when fluid handling system 300B is shut down for maintenance, etc. System 300B may include a bearing valve 374 and a bearing flush line valve 376.

In some embodiments, fluid handling system 300B supplies bearings of PX 310 with first fluid. In some embodiments, fluid handling system 300B includes one or more components configured to flush bearings of PX 310 with fluid. One or more of the components used to supply the bearings of PX 310 with fluid and flush the bearings of PX 310 with fluid may be the same. In some embodiments, fluid handling system 300B includes bearing supply line 371. Bearing supply line 371 may be a conduit that is configured to receive a portion of high pressure first fluid upstream of the high pressure inlet of PX 310. In some embodiments, bearing supply line 371 receives high pressure first fluid upstream of HP in flow valve 332. In some embodiments, bearing supply line 371 may supply high pressure first fluid to bearing filter 372. Bearing filter 372 may filter the high pressure first fluid. In some embodiments, bearing filter 372 filters contaminants (e.g., solids, particles, abrasives, etc.) from the high pressure first fluid. In some embodiments, bearing filter 372 receives high pressure fluid via bearing supply line 373. Bearing supply line 373 may receive high pressure fluid discharged from the PX 310.

The high pressure first fluid from bearing supply line 371 may be provided to bearing valve 374. Bearing valve 374 may include two or more ports. In some embodiments, bearing valve 374 includes three ports. Controller 380 may control actuation of the ports of bearing valve 374 (e.g., control which ports of bearing valve 374 are open and/or closed, control how open or closed the ports of the bearing valve 374 are). Bearing valve 374 may be configured to receive a supply of high pressure first fluid and provide the high pressure first fluid to a housing of PX 310 to flush bearings of PX 310. Bearing valve 374 may be configured to receive flush fluid from the housing of PX 310 and direct the flush fluid through bearing flush drain line 378 that has an outlet downstream of the low pressure outlet of PX 310.

During operation of PX 310, controller 380 may cause a first port 381 of bearing valve 374 to be actuated to an open position to cause bearing valve 374 to receive filtered high pressure first fluid from bearing filter 372. Controller 380 may additionally cause a second port 382 of bearing valve 374 to be actuated to an open position (e.g., and a third port 383 of bearing valve 374 to be actuated to a closed position) to cause the filtered high pressure first fluid to be supplied to the housing of PX 310 (e.g., without bypassing the PX 310). The filtered high pressure first fluid may be provided through the housing to one or more bearings (e.g., bearing surfaces) of PX 310. Supplying filtered high pressure first fluid to the bearings of PX 310 may lubricate the bearings, reduce wear on PX 310, increase amount of time between maintenance operations, and provide increased service life of PX 310.

During a bearing flush procedure, controller 380 may cause the first port 381 to be actuated to a closed position to stop a flow of high pressure first fluid from bearing filter 372 to the PX 310. Bearing valve 374 may receive flush fluid from the housing of PX 310 via the open second port 382. Controller 380 may cause a third port 383 of bearing valve 374 to be actuated to an open position to direct the flush fluid towards bearing flush line valve 376 via bearing flush drain line 378. Bearing flush line valve 376 may be opened during the bearing flush procedure to cause the flush fluid to be discharged into the low pressure first fluid exiting the low pressure outlet of PX 310. The flush fluid may contain particles (e.g., solids, particulates, abrasives, etc.) flushed from the bearings of PX 310. Flushing particles from the bearings of PX 310 may reduce wear, increase amount of time between maintenance operations, and provide increased service life of PX 310.

In some embodiments, fluid handling system 300B includes a clean discharge filter 360. Clean discharge filter 360 may receive low pressure first fluid output from the low pressure outlet of PX 310. Clean discharge filter 360 may be configured to filter the low pressure first fluid subsequent to the first fluid exiting PX 310 to remove contaminants (e.g., particles, solids, abrasives, etc.) from the low pressure first fluid. In some embodiments, clean discharge filter 360 may receive a portion of high pressure first fluid as a flush fluid via filter flush line 362. Filter flush line 362 may be a conduit that is configured to receive a portion of high pressure first fluid upstream of the high pressure inlet of PX 310. The portion of high pressure first fluid supplied to clean discharge filter 360 as flush fluid may transport particulates, etc. (e.g., filtered out of the low pressure first fluid by clean discharge filter 360) away from clean discharge filter 360. In some embodiments, the particulates may be transported to the low pressure second fluid that is to be provided to the low pressure inlet of PX 310. In some embodiments, the particulates from clean discharge filter 360 are discharged into the low pressure second fluid. In embodiments where the first fluid substantially flows in a closed loop (e.g., FIGS. 1B and 1D), filtering the first fluid via clean discharge filter 360 may reduce wear from abrasive particles on the HP supply pump.

Figure 3C:
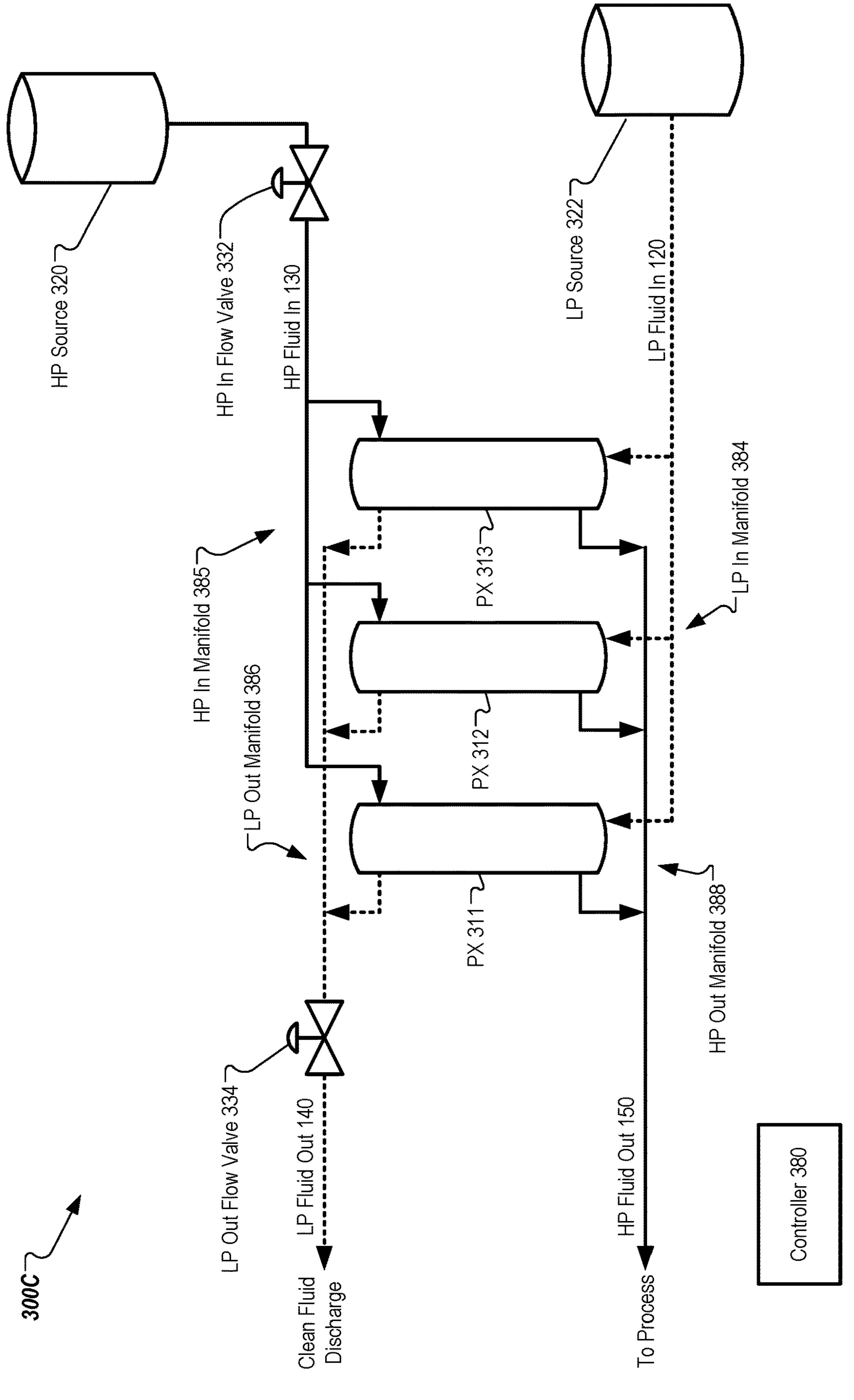

FIG. 3C is a schematic diagram of a fluid handling system 300C including multiple pressure exchangers (e.g., PX 311, 312, and 313), according to certain embodiments. In some embodiments, features that have reference numbers and/or names that are similar to reference numbers and/or names in other figures include similar properties, structures, and/or functionality as those described in other figures. In some examples, features of fluid handling system 300C has similar properties, structures, and/or functionality as features of fluid handling system 300A of FIG. 3A and/or fluid handling system 300B of FIG. 3B.

In some embodiments, fluid handling system 300C includes two or more pressure exchangers. In some embodiments (e.g., as shown in FIG. 3C), fluid handling system 300C includes three pressure exchangers. Fluid handling system 300C may include PX 311, PX 312, and PX 313. In some embodiments, PX 311, PX 312, and PX 313 operate in parallel to one another. In some embodiments, PX 311, PX 312, and PX 313 may operate in series with one another.

In some embodiments, a corresponding high pressure inlet of each of PX 311, PX 312, and PX 313 is fluidly coupled to HP in manifold 385. HP in manifold 385 may receive high pressure first fluid (e.g., HP fluid in 130) from HP in flow valve 332. The high pressure inlet of each of PX 311, PX 312, and PX 313 may receive a portion of high pressure first fluid from HP in manifold 385.

A low pressure inlet of each of PX 311, PX 312, and PX 313 may be fluidly coupled to LP in manifold 384. LP in manifold 384 may receive low pressure second fluid (e.g., LP fluid in 120) from LP source 322. The low pressure inlet of each of PX 311, PX 312, and PX 313 may receive a portion of low pressure second fluid from LP in manifold 385.

Each of PX 311, PX 312, and PX 313 may exchange pressure between the high pressure first fluid and the low pressure second fluid. Low pressure first fluid may be output by each of PX 311, PX 312, and PX 313 via the low pressure outlet of each of PX 311, PX 312, and PX 313 to LP out manifold 386. LP out manifold 386 may direct the low pressure first fluid (e.g., LP fluid out 140) toward LP out flow valve 334. High pressure second fluid may be output by each of PX 311, PX 312, and PX 313 via the high pressure outlet of each of PX 311, PX 312, and PX 313 to HP out manifold 388. HP out manifold may direct the high pressure second fluid (e.g., HP fluid out 150) towards a process (e.g., a fracing process, a slurry pumping process). Any of the embodiments of the present disclosure may include multiple PXs (e.g., as shown in FIG. 3C).

Figure 3D:
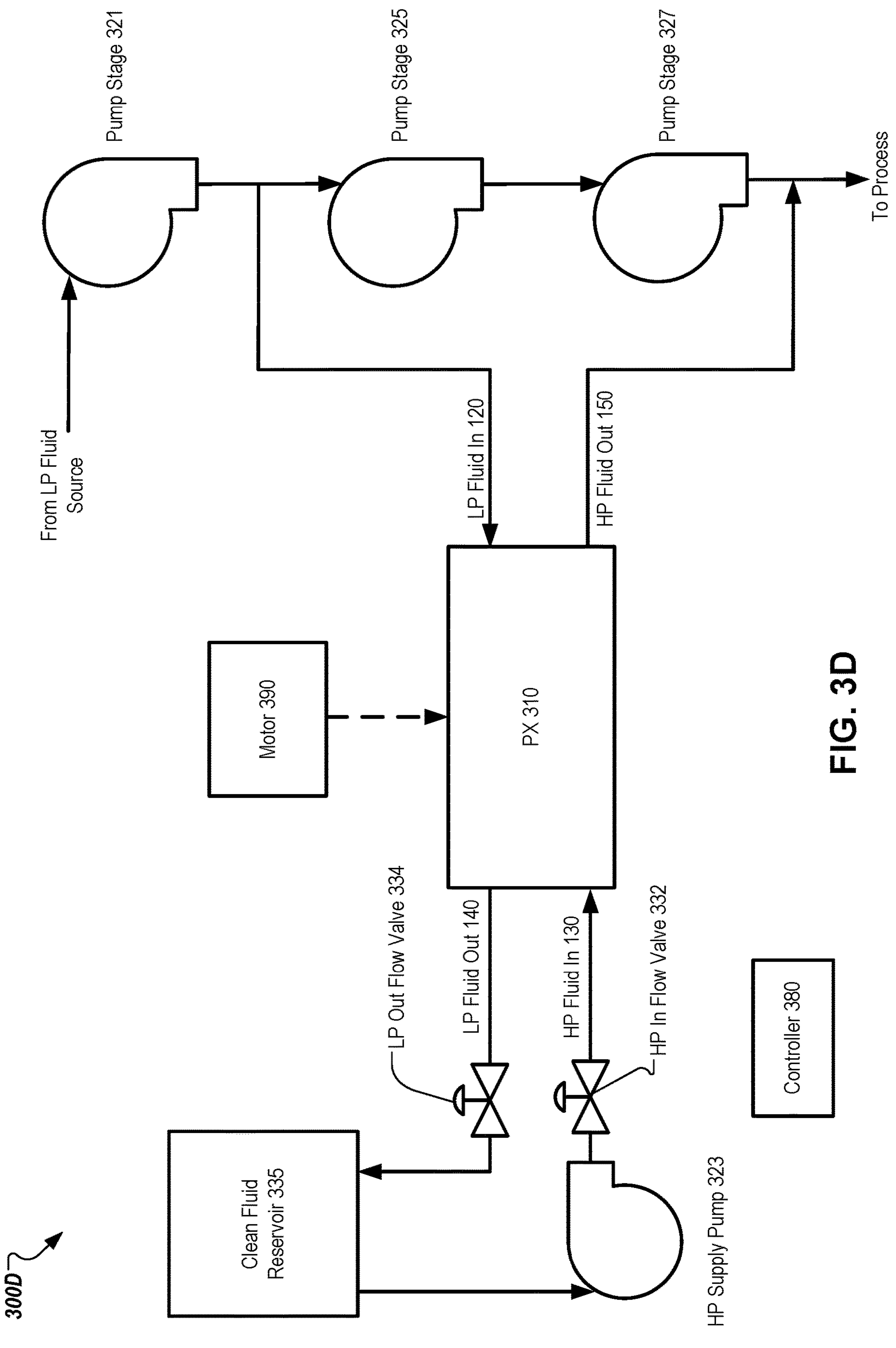

FIG. 3D is a schematic diagram of a fluid handling system 300D that includes a PX 310, according to certain embodiments. In some embodiments, features that have reference numbers and/or names that are similar to reference numbers and/or names in other figures include similar properties, structures, and/or functionality as those described in other figures. In some examples, fluid handling system 300D has similar features and/or functionality as one or more features of fluid handling system 300A of FIG. 3A, fluid handling system 300B of FIG. 3B, and/or fluid handling system 300A of FIG. 3C.

In some embodiments, fluid handling system 300D includes an HP supply pump 323. HP supply pump may receive the first fluid from a clean fluid reservoir 335. Clean fluid reservoir 335 may be a reservoir for holding the first fluid. In some embodiments, clean fluid reservoir 335 is a pond or a tank. HP supply pump 323 may raise the pressure of the first fluid to meet a threshold pressure value. The high pressure first fluid is supplied to the high pressure inlet of PX 310 via HP in flow valve 332. Pressure is exchanged in the PX 310 and the first fluid exits the PX 310 as a low pressure first fluid. The low pressure first fluid is provided to the clean fluid reservoir 335 from the low pressure outlet of PX 310 via LP out flow valve 334.

In some embodiments, fluid handling system 300D includes one or more pump stages (e.g., one or more different pumps) that are configured to pump the second fluid. In some embodiments, fluid handling system 300D includes pump stage 321 to pump the second fluid from a low pressure source of the second fluid. Pump stage 321 may be a first pump stage. Pump stage 321 may be a centrifugal pump or a displacement pump. Pump stage 321 may provide a portion of the second fluid at a low pressure to the low pressure inlet of PX 310. PX 310 may exchange pressure between the high pressure first fluid and the low pressure second fluid. PX 310 may provide high pressure second fluid at the high pressure outlet. The high pressure second fluid may be directed to a process (e.g., a fracing process, a slurry pumping process, etc.).

In some embodiments, a one or more additional pump stages (e.g., pump stage 325 and pump stage 327) may receive a portion of the second fluid from pump stage 321 and further raise the pressure of the portion of the second fluid. Pump stages 325 and 327 may operate in parallel to PX 310. In some embodiments, fluid handling system 300D includes pump stages in addition to pump stages 325 and 327 working in parallel to PX 310. In some embodiments, fluid handling system 300D includes a single pump stage working in parallel to PX 310. In some embodiments, PX 310 supplements the flowrate of second fluid being pumped by one or more pump stages from the low pressure source to the process.

Figure 4:
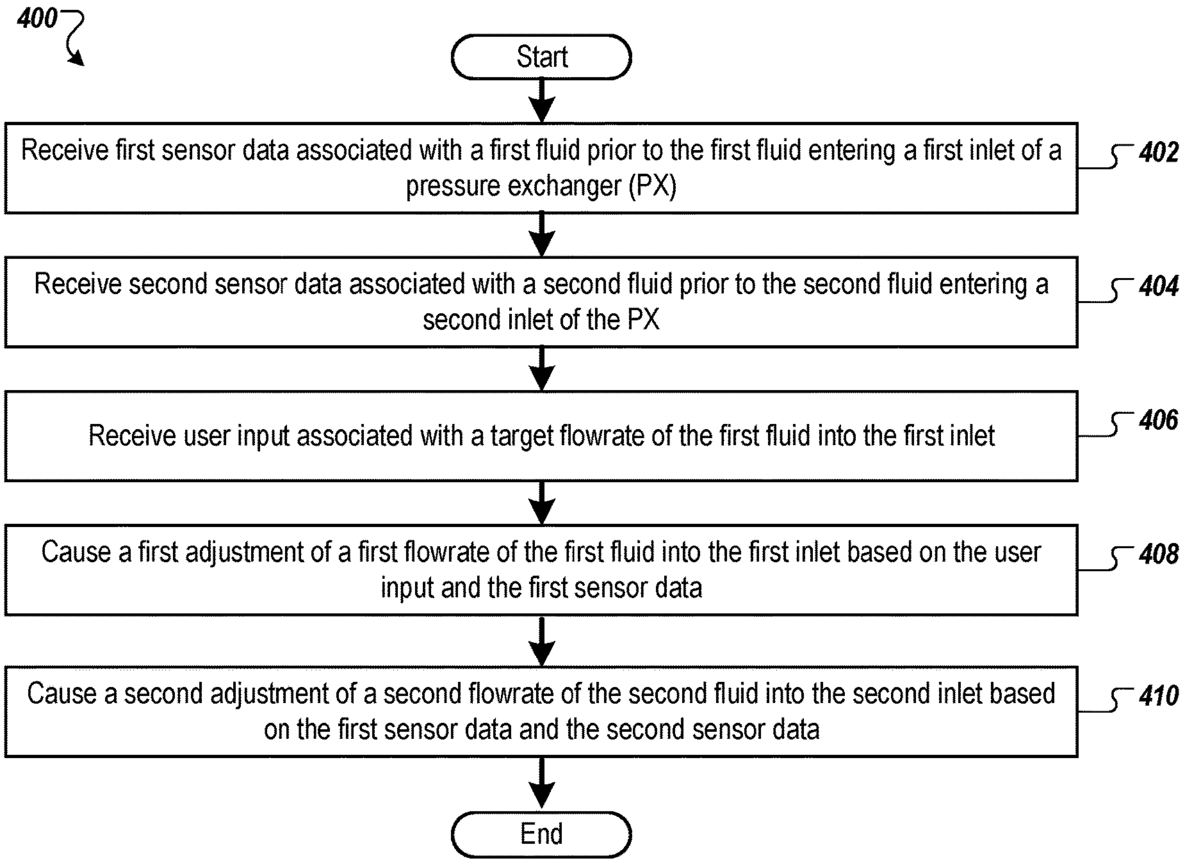
FIG. 4 is a flow diagram illustrating a method for controlling a fluid handling system, according to certain embodiments.

FIG. 4 is a flow diagram illustrating a method 400 for controlling a fluid handling system (e.g., fluid handling systems 300A-D of FIGS. 3A-D), according to certain embodiments. In some embodiments, method 400 is performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 400 is performed, at least in part, by a controller (e.g., controller 180 of FIGS. 1A-D, controller 380 of FIGS. 3A-D). In some embodiments, a non-transitory storage medium stores instructions that when executed by a processing device (e.g., of controller 180 of FIGS. 1A-D, controller 380 of FIGS. 3A-D, etc.), cause the processing device to perform method 400.

For simplicity of explanation, method 400 is depicted and described as a series of operations. However, operations in accordance with this disclosure can occur in various orders and/or concurrently and with other operations not presented and described herein. Furthermore, in some embodiments, not all illustrated operations are performed to implement method 400 in accordance with the disclosed subject matter. In addition, those skilled in the art will understand and appreciate that method 400 could alternatively be represented as a series of interrelated states via a state diagram or events.

At block 402, processing logic (e.g., controller 180 of FIGS. 1A-D, controller 380 of FIGS. 3A-D) may receive first sensor data associated with a first fluid prior to the first fluid entering a first inlet of a PX (e.g., sensor data associated with the first fluid upstream from the first inlet). In some embodiments, the first sensor data includes flow data (e.g., volumetric flowrate date, mass flowrate data, velocity data, etc.) of the first fluid prior to the first fluid entering the first inlet of the PX. In some embodiments, the first sensor data includes pressure data of the first fluid prior to the first fluid entering the first inlet of the PX. One or more types of data may be calculated from one or more other types of data (e.g., volumetric flowrate data can be calculated by the processing logic based on pressure sensor data). The first fluid may be a substantially particle-free fluid. The first fluid may be at a higher pressure than a second fluid. The first inlet may be a high pressure inlet of the PX. The PX may be configured to receive the first fluid via a high pressure inlet and a second fluid (e.g., that is at a lower pressure than the first fluid) via a second, low pressure inlet. The PX may be configured to exchange pressure between the high pressure first fluid and the low pressure second fluid. The PX may provide low pressure first fluid via a low pressure outlet and high pressure second fluid via a high pressure outlet.

At block 404, the processing logic may receive second sensor data associated with the second fluid prior to the second fluid entering a second inlet of the PX (e.g., sensor data associated with the second fluid upstream of the second inlet). In some embodiments, the second sensor data includes flow data (e.g., volumetric flowrate date, mass flowrate data, velocity data, etc.) of the second fluid prior to the second fluid entering the second inlet of the PX. In some embodiments, the second sensor data includes pressure data of the second fluid prior to the second fluid entering the second inlet of the PX. The second fluid may be a particle-laden fluid (e.g., a slurry fluid, a frac fluid, etc.). The second inlet of the PX may be a low pressure inlet.

At block 406, the processing logic may receive user input associated with a target flowrate of the first fluid into the first inlet of the PX. The user input may indicate a target flowrate of the high pressure first fluid into the high pressure inlet of the PX. The user input may be provided by a user via a GUI associated with the controller.

At block 408, the processing logic may cause a first adjustment of a first flowrate of the first fluid into the first inlet based on the user input and the first sensor data. The first adjustment may be caused via one or more of a control valve or a supply pump. In some embodiments, the processing logic may adjust a flowrate of the high pressure first fluid provided to the high pressure inlet of the PX via one or more of a high pressure flow control valve (e.g., HP in flow valve 131 of FIGS. 1A-D, HP in flow valve 332 of FIGS. 3A-D) or a high pressure supply pump (e.g., HP supply pump 323 of FIG. 3D). The processing logic may cause the first adjustment to cause the flowrate of the high pressure first fluid provided to the high pressure inlet to substantially match the target flowrate indicated by the user input.

At block 410, the processing logic may cause a second adjustment of a second flowrate of the second fluid provided to the second inlet based on the first sensor data and the second sensor data. In some embodiments, the processing logic may adjust a flowrate of the low pressure second fluid to the low pressure inlet of the PX via one or more of a low pressure flow control valve (e.g., LP out flow valve 141 of FIGS. 1A-D, LP out flow valve 334 of FIGS. 3A-D) or a low pressure supply pump (e.g., pump stage 321 of FIG. 3D). The processing logic may cause the second adjustment based on sensor data (e.g., pressure data and/or flow data) to achieve a ratio of the flowrate of the first fluid to the flowrate of the second fluid (e.g., see description of FIG. 3A). The ratio of the flowrate of the first fluid to the flowrate of the second fluid may be based at least on a concentration of particles in the second fluid. The concentration of particles may be provided by a user input, in some embodiments. In some embodiments, the concentration of particles may be determined by processing logic based on sensor data (e.g., sensor data collected by a particle counter or similar sensor).

In some embodiments, the processing logic may cause the second adjustment based on a lookup table. The lookup table may be stored in memory (e.g., of a processing device) accessible to the processing logic. The lookup table may be a matrix of values. The lookup table may map values of first sensor data and/or values of second sensor data to corresponding adjustments. For example, by referring to the lookup table, the processing logic may determine that for a first given input of first sensor data and a second given input of second sensor data, the processing logic is to perform an indicated (e.g., by the lookup table) adjustment to the flowrate of the second fluid. The lookup table may be generated from historical sensor data collected during operation of the system. The processing logic may identify the lookup table based on historical sensor data (e.g., historical data from the first and/or second sensor) and historical performance data. The historical performance data may be based on performance of the fluid handling system (e.g., total flow, maintenance data, pressure differentials, etc.). The processing logic may determine the second adjustment from the lookup table based on the first sensor data, the second sensor data, motor data received from a motor driving the PX (e.g., revolutions per minutes, total run time, run time between maintenance, total revolutions, etc.) and the concentration of particles in the second fluid.

The present disclosure solves the problem of abrasive slurries causing damage and wear to pumps used to pump slurry. The present disclosure includes using the pressure exchanger (PX) as a pump isolator to keep the pump from coming in contact with the slurry.

In some embodiments, for the HP inlet flow, any type of pump can be used to give the clean motive flow. In some embodiments, for the LP inlet flow, a pump or any process that can give the required positive head to drive the spent clean fluid out of the duct and fill it with the slurry that needs to be pumped.

The HP outlet flow may be the slurry that needs to be moved or pressurized in the process. The LP outlet flow may be the clean fluid that was once the high pressure inlet flow.

The present disclosure includes a method for pumping abrasive/solids laden flow.

In some embodiments, there is a Flow control valve on the LPOUT of the system to set the flow from the slurry supply into the PX.

HP In flow is to be regulated to ensure proper slurry transport and minimize loss of clean fluid to the HP Out. In some embodiments, there could be a positive displacement pump feeding the HP In of the skid or there could be a Flow control valve on the HPIN of the system to set the flow from the clean supply pump (if it is a dynamic or centrifugal style pump). In some embodiments, there could be a motor driving the pressure exchanger to set the travel distance the flows have in cartridge.

In some embodiments, the PX is used for low pressure solids or abrasives transport via pipeline.

The present disclosure can be used in one or more of: wastewater; mining; dredging; construction; minerals processing; oil and gas (O&G) upstream; O&G downstream; agricultural processing facilities; food processing; industrial/residential waste; and/or the like. The present disclosure can be used in many industries wherever abrasives or solids are pumped or transported. The present disclosure can be used with clean fluids. The present disclosure can be used with slurry (e.g., at a sand mine).

Figure 5:
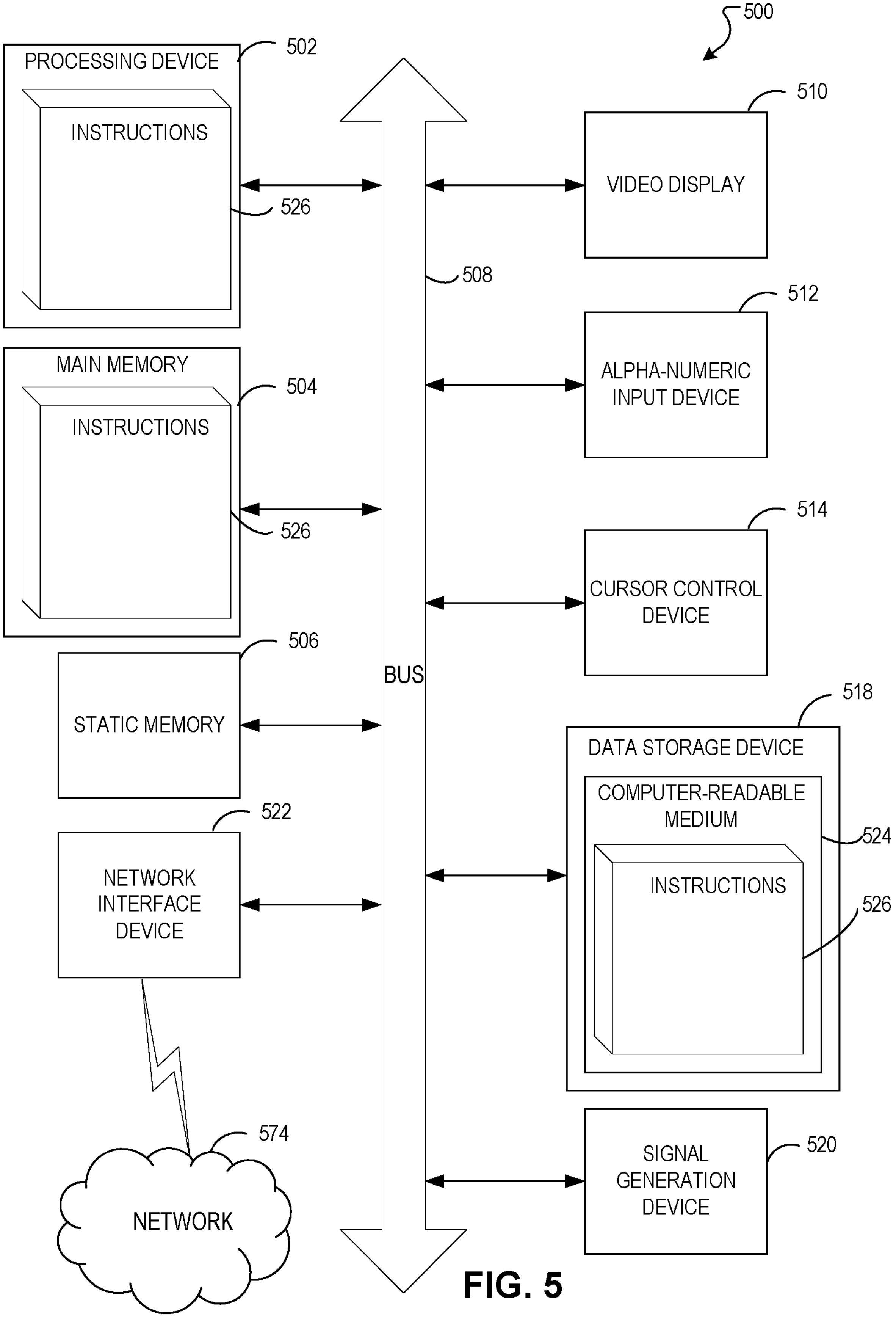
FIG. 5 is a block diagram illustrating a computer system, according to certain embodiments

FIG. 5 is a block diagram illustrating a computer system 500, according to certain embodiments. In some embodiments, the computer system 500 is a client device. In some embodiments, the computer system 500 is a controller device (e.g., server, controller 180 of FIGS. 1A-D, controller 380 of FIGS. 3A-D).

In some embodiments, computer system 500 is connected (e.g., via a network, such as a Local Area Network (LAN), an intranet, an extranet, or the Internet) to other computer systems. Computer system 500 operates in the capacity of a server or a client computer in a client-server environment, or as a peer computer in a peer-to-peer or distributed network environment. In some embodiments, computer system 500 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In some embodiments, the computer system 500 includes a processing device 502, a volatile memory 504 (e.g., Random Access Memory (RAM)), a non-volatile memory 506 (e.g., Read-Only Memory (ROM) or Electrically-Erasable Programmable ROM (EEPROM)), and/or a data storage device 516, which communicates with each other via a bus 508.

In some embodiments, processing device 502 is provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor). In some embodiments, processing device 502 is provided by one or more of a single processor, multiple processors, a single processor having multiple processing cores, and/or the like.

In some embodiments, computer system 500 further includes a network interface device 522 (e.g., coupled to network 574). In some embodiments, the computer system 500 includes one or more input/output (I/O) devices. In some embodiments, computer system 500 also includes a video display unit 510 (e.g., a liquid crystal display (LCD)), an alphanumeric input device 512 (e.g., a keyboard), a cursor control device 514 (e.g., a mouse), and/or a signal generation device 520.

In some implementations, data storage device 518 (e.g., disk drive storage, fixed and/or removable storage devices, fixed disk drive, removable memory card, optical storage, network attached storage (NAS), and/or storage area-network (SAN)) includes a non-transitory computer-readable storage medium 524 on which stores instructions 526 encoding any one or more of the methods or functions described herein, and for implementing methods described herein.

In some embodiments, instructions 526 also reside, completely or partially, within volatile memory 504 and/or within processing device 502 during execution thereof by computer system 500, hence, volatile memory 504 and processing device 502 also constitute machine-readable storage media, in some embodiments.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "actuating," "adjusting," "causing," "controlling," "determining," "identifying," "providing," "receiving," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The preceding description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about," "substantially," or "approximately" is used herein, this is intended to mean that the nominal value presented is precise within ±10%. Also, the terms "first," "second," "third," "fourth," etc. as used herein are meant as labels to distinguish among different elements and can not necessarily have an ordinal meaning according to their numerical designation.

The terms "over," "under," "between," "disposed on," and "on" as used herein refer to a relative position of one material layer or component with respect to other layers or components. For example, one layer disposed on, over, or under another layer may be directly in contact with the other layer or may have one or more intervening layers. Moreover, one layer disposed between two layers may be directly in contact with the two layers or may have one or more intervening layers. Similarly, unless explicitly stated otherwise, one feature disposed between two features may be in direct contact with the adjacent features or may have one or more intervening layers.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. In one embodiment, multiple metal bonding operations are performed as a single step.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which each claim is entitled.

What is claimed is:

1. A system comprising:

a pressure exchanger (PX) configured to receive a first fluid via a first inlet of the PX, receive a second fluid via a second inlet of the PX, and exchange pressure between the first fluid and the second fluid, wherein the first fluid is to exit the PX via a first outlet of the PX, and wherein the second fluid is to exit the PX via a second outlet of the PX;

a bearing valve fluidly coupled to a housing of the PX and configured to provide first fluid to the housing of the PX;

a first sensor configured to provide first sensor data associated with the first fluid prior to the first fluid entering the first inlet;

a second sensor configured to provide second sensor data associated with the second fluid prior to the second fluid entering the second inlet; and a controller configured to:

receive user input associated with a target flowrate of the first fluid into the first inlet;

cause a first valve disposed upstream of the first inlet to actuate based on the user input and the first sensor data to cause a first adjustment of a first flowrate of the first fluid into the first inlet; and cause a second valve disposed downstream of the first outlet to actuate based on the first sensor data and the second sensor data to cause a second adjustment of a second flowrate of the second fluid into the second inlet.

2. The system of claim 1, wherein the first fluid is a substantially particle-free fluid, and wherein the second fluid is a particle-laden fluid.

3. The system of claim 1, wherein the first fluid is a substantially non-caustic fluid, and wherein the second fluid is a caustic fluid.

4. The system of claim 1, wherein the controller is to control a first pump configured to provide the first fluid to the first inlet of the PX to further cause the first adjustment of the first flowrate.

5. The system of claim 1, wherein the controller is to control a second pump configured to provide the second fluid to the second inlet of the PX to further cause the second adjustment of the second flowrate.

6. The system of claim 1, wherein the first fluid is to enter the PX via the first inlet at a first pressure that is higher than a second pressure of the second fluid entering the PX via the second inlet, and wherein the first fluid is to exit the PX via the first outlet at a third pressure that is lower than a fourth pressure of the second fluid exiting the PX via the second outlet.

7. The system of claim 1, further comprising a third sensor configured to provide third sensor data associated with the first fluid subsequent to exiting the first outlet, and wherein the controller is configured to cause performance of a corrective action based on a difference between the second sensor data and the third sensor data.

8. The system of claim 1 further comprising a filter fluidly coupled to and disposed downstream from the first outlet of the PX, wherein the filter is configured to filter the first fluid subsequent to the first fluid exiting the first outlet.

9. The system of claim 1 further comprising a motor coupled to the PX, wherein the system further comprises a motor sensor configured to provide motor data associated with the motor, wherein at least one of the first adjustment of the first flowrate or the second adjustment of the second flowrate is further based on the motor data.

10. The system of claim 1, wherein the bearing valve comprises a first port fluidly coupled to a first conduit upstream of the first inlet of the PX, a second port fluidly coupled to the housing of the PX, and a third port fluidly coupled to a second conduit downstream of the first outlet, and wherein the controller is further configured to:

actuate the first port to a first open position to receive a first portion of the first fluid from the first conduit and actuate the second port to a second open position to provide the first portion of the first fluid to the housing of the PX; and actuate the first port to a first closed position and actuate the third port to a third open position to cause the first portion of the first fluid to flow from the housing to the second conduit downstream of the first outlet.

11. The system of claim 10, further comprising a bearing filter disposed between the first conduit and the first port, wherein the first portion of the first fluid passes through the bearing filter and enters the housing to flush bearings disposed in the housing.

12. The system of claim 1, wherein the controller is configured to control the first valve upstream of the first inlet and the second valve downstream of the first outlet to control a ratio of flowrates of the first fluid to the second fluid flowing through the PX.

13. The system of claim 1, wherein the controller is further configured to:

identify a lookup table generated based on historical sensor data and historical performance data; and determine the second adjustment from the lookup table based on the first sensor data, the second sensor data, motor data, and concentration of particles in the second fluid.

14. The system of claim 13, wherein the second adjustment is further based on a pressure differential of the first fluid prior to entering the first inlet and subsequent to exiting the first outlet.

15. A method comprising:

receiving first sensor data associated with a first fluid prior to the first fluid entering a first inlet of a pressure exchanger (PX), wherein the PX is configured to receive the first fluid via the first inlet of the PX, receive a second fluid via a second inlet of the PX, and exchange pressure between the first fluid and the second fluid, wherein the first fluid is to exit the PX via a first outlet of the PX, and wherein the second fluid is to exit the PX via a second outlet of the PX;

causing a bearing valve fluidly coupled to a housing of the PX to actuate to provide first fluid to the housing of the PX;

receiving second sensor data associated with the second fluid prior to the second fluid entering the second inlet of the PX;

receiving user input associated with a target flowrate of the first fluid into the first inlet;

causing a first valve disposed upstream of the first inlet of the PX to actuate based on the user input and the first sensor data to cause a first adjustment of a first flowrate of the first fluid into the first inlet; and causing a second valve disposed downstream of the first outlet of the PX to actuate based on the first sensor data and the second sensor data to cause a second adjustment of a second flowrate of the second fluid into the second inlet.

16. The method of claim 15, further comprising:

controlling a first pump configured to provide the first fluid to the first inlet of the PX to further cause the first adjustment of the first flowrate; and controlling a second pump configured to provide the second fluid to the second inlet of the PX to further cause the second adjustment of the second flowrate.

17. The method of claim 15, wherein the causing of the bearing valve to actuate comprises:

actuating a first port of the bearing valve to a first open position to receive a first portion of the first fluid from a first conduit upstream of the first inlet of the PX and actuate a second port of the bearing valve fluidly coupled to the housing of the PX to a second open position to provide the first portion of the first fluid to the housing of the PX; and actuating the first port to a first closed position and actuate a third port of the bearing valve fluidly coupled to a second conduit downstream of the first outlet to a third open position to cause the first portion of the first fluid to flow from the housing to the second conduit downstream of the first outlet.

18. A controller comprising:
memory; and
a processing device coupled to the memory, wherein the processing device is to:
receive first sensor data associated with a first fluid prior to the first fluid entering a first inlet of a pressure exchanger (PX), wherein the PX is configured to receive the first fluid via the first inlet of the PX, receive a second fluid via a second inlet of the PX, and exchange pressure between the first fluid and the second fluid, wherein the first fluid is to exit the PX via a first outlet of the PX, and wherein the second fluid is to exit the PX via a second outlet of the PX;
cause a bearing valve fluidly coupled to a housing of the PX to actuate to provide first fluid to the housing of the PX;
receive second sensor data associated with the second fluid prior to the second fluid entering the second inlet of the PX;
receive user input associated with a target flowrate of the first fluid into the first inlet;
cause a first valve disposed upstream of the first inlet of the PX to actuate based on the user input and the first sensor data to cause a first adjustment of a first flowrate of the first fluid into the first inlet; and
cause a second valve disposed downstream of the first outlet of the PX to actuate based on the first sensor data and the second sensor data to cause a second adjustment of a second flowrate of the second fluid into the second inlet.

19. The controller of claim 18, wherein the processing device is further to:
control a first pump configured to provide the first fluid to the first inlet of the PX to further cause the first adjustment of the first flowrate; and
control a second pump configured to provide the second fluid to the second inlet of the PX to further cause the second adjustment of the second flowrate.

20. The controller of claim 18, wherein to cause the bearing valve to actuate, the processing device is to:
actuate a first port of the bearing valve to a first open position to receive a first portion of the first fluid from a first conduit upstream of the first inlet of the PX and actuate a second port of the bearing valve fluidly coupled to the housing of the PX to a second open position to provide the first portion of the first fluid to the housing of the PX; and
actuate the first port to a first closed position and actuate a third port of the bearing valve fluidly coupled to a second conduit downstream of the first outlet to a third open position to cause the first portion of the first fluid to flow from the housing to the second conduit downstream of the first outlet.

* * * * *